United States Patent
Akkarakaran et al.

(10) Patent No.: US 11,502,889 B2
(45) Date of Patent: *Nov. 15, 2022

(54) ENHANCEMENTS TO PHASE-NOISE COMPENSATION REFERENCE SIGNAL DESIGN AND SCRAMBLING

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/018,266

(22) Filed: Sep. 11, 2020

(65) Prior Publication Data
US 2020/0412592 A1    Dec. 31, 2020

Related U.S. Application Data

(63) Continuation of application No. 16/436,458, filed on Jun. 10, 2019, now Pat. No. 10,778,493, which is a
(Continued)

(51) Int. Cl.
*H04W 28/02* (2009.01)
*H04L 27/26* (2006.01)
(Continued)

(52) U.S. Cl.
CPC ........ *H04L 27/2636* (2013.01); *G01S 13/346* (2013.01); *H04L 5/0048* (2013.01);
(Continued)

(58) Field of Classification Search
CPC ..... H04L 5/0048; H04L 5/0053; H04L 5/001; H04L 27/2613; H04L 5/0007;
(Continued)

(56) References Cited

U.S. PATENT DOCUMENTS 7,773,679 B2   8/2010  Laroia et al.
8,345,566 B2   1/2013  You et al.
(Continued)

FOREIGN PATENT DOCUMENTS

CN   1213833 A    4/1999
CN   102470762 A   5/2012
(Continued)

OTHER PUBLICATIONS

Huawei et al., "Handling of DC Subcarrier in NR",3GPP Draft; R1-1611654, 3rd Generation Partnership Project (3GPP), Mobile Competence Centre; 650, Route Des Lucioles; F-06921 Sophia-Antipolis Cedex ; France vol. RAN WG1, No. Reno, USA; Nov. 14, 2016-Nov. 18, 2016 Nov. 5, 2016 (Nov. 5, 2016), XP051190060, 3 Pages, Retrieved from the Internet: URL:http://www.3gpp.org/ftp/tsg ranjWG1_RL1/TSGR1 87/Docs/-[retrieved on Nov. 5, 2016].
(Continued)

*Primary Examiner* — Eva Y Puente
(74) *Attorney, Agent, or Firm* — Yanling Yang

(57) ABSTRACT

Methods, systems, and devices for wireless communication are described. In one example, phase-noise compensation tracking signals (PTRS) may be transmitted using sets of resource blocks (RBs), where a frequency for each PTRS within the sets RBs is different from a frequency corresponding to a direct current (DC) tone. In another example, a time-domain-based PTRS may be used, where a discrete Fourier transform (DFT)-spread-orthogonal frequency division multiplexing (DFT-s-OFDM) symbol may include a cyclic prefix and a PTRS inserted in the DFT-s-OFDM symbol. Additionally or alternatively, a guard-interval-based DFT-s-OFDM symbol may include a PTRS that replaces part or all of a guard interval. In some examples, subsets of tones used for PTRS across a system bandwidth may be transmitted using a scrambled modulation symbol, where at
(Continued)

least one antenna port may be used for the transmission of PTRS.

12 Claims, 15 Drawing Sheets

Related U.S. Application Data continuation of application No. 15/707,821, filed on Sep. 18, 2017, now Pat. No. 10,367,672.

(60) Provisional application No. 62/401,049, filed on Sep. 28, 2016.

(51) Int. Cl.
  *H04L 5/00* (2006.01)
  *G01S 13/34* (2006.01)
  *H04B 7/0413* (2017.01)

(52) U.S. Cl.
  CPC ........ *H04L 5/0053* (2013.01); *H04L 27/2605* (2013.01); *H04L 27/2613* (2013.01); *H04L 27/2628* (2013.01); *H04B 7/0413* (2013.01); *H04L 5/0007* (2013.01); *H04W 28/0236* (2013.01)

(58) Field of Classification Search
  CPC ... H04L 5/0044; H04L 5/0051; H04L 5/0091; H04L 5/0023; H04L 5/0092; H04L 5/0094; H04L 27/2692; H04W 72/0453; H04W 72/042; H04W 56/001; H04W 56/0015; H04W 72/02; H04W 16/14; H04W 24/02; H04W 4/70; H04W 56/00; H04W 72/1263; H04W 72/14; H04W 88/02; H04W 56/0035; H04B 7/0413; H04B 1/30; H04B 2001/305; H04B 7/0456; H04B 10/5055; H04B 1/005; H04B 7/0617; H04B 7/0639; H04B 7/0691; H04B 7/155; H04B 7/15528; H04B 7/15542
  USPC ......................................................... 370/329
  See application file for complete search history.

(56) References Cited

U.S. PATENT DOCUMENTS

| | | | |
|---|---|---|---|
| 9,444,595 | B2 | 9/2016 | Zhao et al. |
| 9,485,127 | B2 | 11/2016 | Huang et al. |
| 9,608,846 | B2 | 3/2017 | Jia et al. |
| 10,367,672 | B2 | 7/2019 | Akkarakaran et al. |
| 10,778,493 | B2 | 9/2020 | Akkarakaran et al. |
| 11,071,124 | B2 * | 7/2021 | Yi ............................ H04L 1/00 |
| 2008/0320247 | A1 | 12/2008 | Morfey et al. |
| 2013/0121274 | A1 * | 5/2013 | Chen .................. H04W 72/042 370/329 |
| 2014/0010324 | A1 | 1/2014 | Kenney et al. |
| 2015/0146640 | A1 | 5/2015 | Baldemair et al. |
| 2015/0334708 | A1 | 11/2015 | Lee et al. |
| 2015/0381330 | A1 | 12/2015 | Chen et al. |
| 2016/0057754 | A1 | 2/2016 | Azizi et al. |
| 2016/0072614 | A1 * | 3/2016 | Blankenship ......... H04L 5/0076 370/329 |
| 2016/0073409 | A1 | 3/2016 | Chen et al. |
| 2016/0088599 | A1 | 3/2016 | Yang et al. |
| 2016/0100403 | A1 * | 4/2016 | Han ....................... H04W 4/70 370/329 |
| 2016/0105803 | A1 | 4/2016 | Sakhnini et al. |
| 2016/0142187 | A1 | 5/2016 | Yang et al. |
| 2016/0183224 | A1 | 6/2016 | Rebeiz et al. |
| 2016/0205664 | A1 | 7/2016 | Zhang et al. |
| 2016/0309473 | A1 | 10/2016 | Kim et al. |
| 2016/0345321 | A1 * | 11/2016 | Chen ..................... H04L 5/0048 |
| 2016/0345347 | A1 * | 11/2016 | Cheng ..................... H04L 25/00 |
| 2017/0005715 | A1 | 1/2017 | Cezanne et al. |
| 2017/0257243 | A1 | 9/2017 | Sahlin et al. |
| 2018/0091350 | A1 | 3/2018 | Akkarakaran et al. |
| 2018/0097671 | A1 | 4/2018 | Huang et al. |
| 2019/0132102 | A1 * | 5/2019 | Kwak ................... H04L 5/0051 |
| 2022/0124666 | A1 * | 4/2022 | Vintola ............... H04W 64/003 |

FOREIGN PATENT DOCUMENTS

| | | |
|---|---|---|
| WO | WO-2013144897 A2 | 10/2013 |
| WO | WO-2016000915 A1 | 1/2016 |
| WO | WO-2016043557 A1 | 3/2016 |
| WO | WO-2017138880 A1 | 8/2017 |

OTHER PUBLICATIONS

Intel Corporation: "Study of Phase Noise Tracking", 3GPP Draft; R1-167888 Study of Phase Noise Tracking, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 19, 2016 (Aug. 19, 2016), XP051142638, 9 pages, Retrieved from the Internet: URL:http://www.3gpp.org/ftp/tsg_ran/WG1_RL1/TSGR1_86/Docs/, [retrieved on Aug. 19, 2016].

International Preliminary Report on Patentability—PCT/US2017/052205, The International Bureau of WIPO—Geneva, Switzerland, dated Dec. 17, 2018.

International Search Report and Written Opinion—PCT/US2017/052205—ISA/EPO—dated Mar. 7, 2018.

LG Electronics: "DMRS Design Issues in NR", 3GPP Draft; R1-166907 LG DMRS Design Issues in NR Final, 3rd Generation Partnership Project (3GPP), Mobile Competence Centre; 650, Route Des Lucioles ; F-06921 Sophia-Antipolis Cedex; France vol. RAN WG1, No. Gothenburg, Sweden; Aug. 22, 2016-Aug. 26, 2016 Aug. 13, 2016 (Aug. 13, 2016), XP051132955, 7 Pages, Retrieved from the Internet: URL:http://www.3gpp.org/ftp/tsgran/WG1_RL1/TSGR1_86/Docs/-[retrieved on Aug. 13, 2016].

Nokia et al., "Reference Symbols Types in NR", 3GPP Draft; R1-167290, 3rd Generation Partnership Project (3GPP), Mobile Competence Centre; 650, Route Des Lucioles; F-06921 Sophia-Antipolis Cedex; France; vol. RAN WG1, No. Gothenburg, Sweden; Aug. 22, 2016-Aug. 26, 2016 Aug. 21, 2016 (Aug. 21, 2016), XP051125813, 3 Pages, Retrieved from the Internet: URL:http://www.3gpp.org/ftp/Meetings_3GPP_SYNC/RAN1/Docs/-[retrieved on Aug. 21, 2016].

Partial International Search Report—PCT/US2017/052205—ISA/EPO—dated Nov. 21, 2017.

Qualcomm Incorporated: "Channelization of short PUCCH," R1-1702631, 3GPP TSG-RAN WG1 #88, Athens, Greece, Feb. 13-17, 2017, 7 pages, retrieved from the URL: http://www.3gpp.org/ftp/tsg_ran/WG1_RL1/TSGR1_88/Docs/R1-1702631.zip.

Samsung: "On UL PTRS for DFT-s-OFDM", 3GPP Draft; R1-1710687 UL PTRS for DFT-s-OFDM, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 16, 2017 (Jun. 16, 2017), XP051304338, 4 pages, Retrieved from the Internet: URL:http://www.3gpp.org/ftp/tsg_ran/WG1_RL1/TSGR1_AH/NR_AH_1706/Docs/, [retrieved on Jun. 16, 2017].

ZTE Corporation et al., "Reference Signal Design for NR MIMO", 3GPP Draft; R1-166213 Reference Signal Design for NR MIMO Final, 3rd Generation Partnership Project (3GPP), Mobile Competence Centre; 650, Route Des Lucioles ; F-06921 Sophia-Antipolis Cedex; France vol. RAN WG1, No. Gothenburg. Sweden; Aug. 22, 2016-Aug. 26, 2016 Aug. 21, 2016 (Aug. 21, 2016), XP051125265, 6 Pages, Retrieved from the Internet: URL:http://www.3gpp.org/ftp/Meetings_3GPPSYNC/RAN1/Docs/-[retrieved on Aug. 21, 2016].

* cited by examiner

# ENHANCEMENTS TO PHASE-NOISE COMPENSATION REFERENCE SIGNAL DESIGN AND SCRAMBLING

CROSS REFERENCES

This application is a continuation of U.S. patent application Ser. No. 16/436,458, entitled "ENHANCEMENTS TO PHASE-NOISE COMPENSATION REFERENCE SIGNAL DESIGN AND SCRAMBLING" and filed Jun. 10, 2019, which is a continuation of U.S. patent application Ser. No. 15/707,821, entitled "ENHANCEMENTS TO PHASE-NOISE COMPENSATION REFERENCE SIGNAL DESIGN AND SCRAMBLING" and filed Sep. 18, 2017, which claims priority to U.S. Provisional Patent Application No. 62/401,049, entitled "ENHANCEMENTS TO PHASE-NOISE COMPENSATION REFERENCE SIGNAL DESIGN AND SCRAMBLING" and filed Sep. 28, 2016, assigned to the assignee hereof, and each of which are hereby expressly incorporated by reference herein in their entirety.

INTRODUCTION

The following relates generally to wireless communication, and more specifically to enhancements to phase-noise compensation reference signal design and scrambling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some cases, transmissions in a wireless communications system may be impacted by interference. As a result, a receiver, such as a UE, may use reference signals to mitigate interference. Depending on a location of the reference signals within wireless resources, however, a receiver may be unable to efficiently receive the reference signals due to interference with tones within the resources. Some receivers may be able to use reference signals assigned to other receivers. However, transmitting additional information to enable this reference signal sharing may significantly increase scheduling overhead and create additional problems. Thus, communication efficiency within the wireless communications system may benefit from techniques that enable coherent scheduling of reference signals and improve flexibility for reference signal reception at a receiver.

SUMMARY

A method of wireless communication is described. The method may include identifying a frequency corresponding to a direct current (DC) tone within a set of resource blocks, determining a frequency for each of one or more phase-noise tracking reference signals (PTRS) based at least in part on the DC tone, each determined frequency different from the frequency corresponding to the DC tone, and transmitting the one or more PTRS using the set of resource blocks based at least in part on the determined frequency.

An apparatus for wireless communication is described. The apparatus may include means for identifying a frequency corresponding to a DC tone within a set of resource blocks, means for determining a frequency for each of one or more PTRS based at least in part on the DC tone, each determined frequency different from the frequency corresponding to the DC tone, and means for transmitting the one or more PTRS using the set of resource blocks based at least in part on the determined frequency.

Another apparatus for wireless communication is described. The apparatus may include a processor, memory in electronic communication with the processor, and instructions stored in the memory. The instructions may be operable to cause the processor to identify a frequency corresponding to a DC tone within a set of resource blocks, determine a frequency for each of one or more PTRS based at least in part on the DC tone, each determined frequency different from the frequency corresponding to the DC tone, and transmit the one or more PTRS using the set of resource blocks based at least in part on the determined frequency.

A non-transitory computer readable medium for wireless communication is described. The non-transitory computer-readable medium may include instructions operable to cause a processor to identify a frequency corresponding to a DC tone within a set of resource blocks, determine a frequency for each of one or more PTRS based at least in part on the DC tone, each determined frequency different from the frequency corresponding to the DC tone, and transmit the one or more PTRS using the set of resource blocks based at least in part on the determined frequency.

Some examples of the method, apparatus, and non-transitory computer-readable medium described above may further include processes, features, means, or instructions for transmitting an indication of the identified frequency corresponding to the DC tone.

Some examples of the method, apparatus, and non-transitory computer-readable medium described above may further include processes, features, means, or instructions for identifying that a resource block of the set of resource blocks overlaps with the DC tone, wherein the one or more PTRS may be transmitted using one or more resource blocks of the set of resource blocks that may be different from the resource block including the DC tone.

Some examples of the method, apparatus, and non-transitory computer-readable medium described above may further include processes, features, means, or instructions for identifying that each resource block of the set of resource blocks includes at least some of the one or more PTRS, wherein the determining may be based at least in part on identifying that each resource block includes at least some of the one or more PTRS.

Some examples of the method, apparatus, and non-transitory computer-readable medium described above may further include processes, features, means, or instructions for identifying that a first resource block of the set of resource blocks overlaps with the DC tone, wherein the determining comprises assigning at least some of the one or more PTRS to one or more frequencies of the first resource block.

In some examples of the method, apparatus, and non-transitory computer-readable medium described above, the` frequency corresponding to each of the one or more PTRS may be based at least in part on a number of component carriers, a system bandwidth, or both.

In some examples of the method, apparatus, and non-transitory computer-readable medium described above, a frequency density of the PTRS may be based at least in part on a number of resource blocks in the set of resource blocks.

Some examples of the method, apparatus, and non-transitory computer-readable medium described above may further include processes, features, means, or instructions for identifying a plurality of tones across the set of resource blocks different from the frequency corresponding to the DC tone, the plurality of tones corresponding to a plurality of symbols across the set of resource blocks and associated with at least one antenna port. Some examples of the method, apparatus, and non-transitory computer-readable medium described above may further include processes, features, means, or instructions for assigning a first subset of the plurality of tones for data. Some examples of the method, apparatus, and non-transitory computer-readable medium described above may further include processes, features, means, or instructions for assigning a second subset of the plurality of tones for PTRS. Some examples of the method, apparatus, and non-transitory computer-readable medium described above may further include processes, features, means, or instructions for scrambling a modulation symbol for each tone of the second subset. Some examples of the method, apparatus, and non-transitory computer-readable medium described above may further include processes, features, means, or instructions for transmitting the first subset and the second subset using the scrambled modulation symbols.

In some examples of the method, apparatus, and non-transitory computer-readable medium described above, the transmitting comprises transmitting the second subset using the at least one antenna port based at least in part on a resource block assignment, the resource block assignment comprising a number of layers used for data in the set of resource blocks.

In some examples of the method, apparatus, and non-transitory computer-readable medium described above, the second subset corresponds to an antenna port of the at least one antenna port. Some examples of the method, apparatus, and non-transitory computer-readable medium described above may further include processes, features, means, or instructions for refraining from transmitting PTRS using the antenna port. Some examples of the method, apparatus, and non-transitory computer-readable medium described above may further include processes, features, means, or instructions for reassigning the second subset for data or a vacant tone.

In some examples of the method, apparatus, and non-transitory computer-readable medium described above, the second subset corresponds to an antenna port of the at least one antenna port and contains at most one tone per resource block of the set of resource blocks. Some examples of the method, apparatus, and non-transitory computer-readable medium described above may further include processes, features, means, or instructions for assigning a third subset of the plurality of tones for a demodulation reference signal (DMRS), the third subset and the first subset overlapping partially, overlapping completely, or being disjoint, and the third subset corresponding to a group of antenna ports of the at least one antenna port. Some examples of the method, apparatus, and non-transitory computer-readable medium described above may further include processes, features, means, or instructions for transmitting the third subset using the group of antenna ports, wherein the third subset comprises each of the at most one tone per resource block of the set of resource blocks.

A method of wireless communication is described. The method may include generating a DFT-s-OFDM symbol, appending a PTRS to the generated DFT-s-OFDM symbol, appending a cyclic prefix to the generated DFT-s-OFDM symbol, and transmitting the generated DFT-s-OFDM symbol comprising the cyclic prefix and the PTRS.

An apparatus for wireless communication is described. The apparatus may include means for generating a DFT-s-OFDM symbol, means for appending a PTRS to the generated DFT-s-OFDM symbol, means for appending a cyclic prefix to the generated DFT-s-OFDM symbol, and means for transmitting the generated DFT-s-OFDM symbol comprising the cyclic prefix and the PTRS.

Another apparatus for wireless communication is described. The apparatus may include a processor, memory in electronic communication with the processor, and instructions stored in the memory. The instructions may be operable to cause the processor to generate a DFT-s-OFDM symbol, append a PTRS to the generated DFT-s-OFDM symbol, append a cyclic prefix to the generated DFT-s-OFDM symbol, and transmit the generated DFT-s-OFDM symbol comprising the cyclic prefix and the PTRS.

A non-transitory computer readable medium for wireless communication is described. The non-transitory computer-readable medium may include instructions operable to cause a processor to generate a DFT-s-OFDM symbol, append a PTRS to the generated DFT-s-OFDM symbol, append a cyclic prefix to the generated DFT-s-OFDM symbol, and transmit the generated DFT-s-OFDM symbol comprising the cyclic prefix and the PTRS.

In some examples of the method, apparatus, and non-transitory computer-readable medium described above, the cyclic prefix may be appended to the beginning of the generated DFT-s-OFDM symbol and the PTRS may be appended to a beginning of the cyclic prefix, to an end of the generated DFT-s-OFDM symbol, or a combination thereof.

In some examples of the method, apparatus, and non-transitory computer-readable medium described above, the generated DFT-s-OFDM symbol comprises a guard interval, and wherein the appending the PTRS to the generated DFT-s-OFDM symbol comprises replacing at least a portion of the guard interval with the PTRS.

Some examples of the method, apparatus, and non-transitory computer-readable medium described above may further include processes, features, means, or instructions for performing a weighted-overlap-and-add scheme within the generated DFT-s-OFDM symbol at a boundary between the generated DFT-s-OFDM symbol and the appended PTRS.

In some examples of the method, apparatus, and non-transitory computer-readable medium described above, appending the PTRS to the generated DFT-s-OFDM symbol comprises assigning the PTRS to an input of a discrete Fourier transform (DFT) spreading operation used to generate the DFT-s-OFDM symbol. In some examples of the method, apparatus, and non-transitory computer-readable medium described above, appending the PTRS to the generated DFT-s-OFDM symbol comprises appending the PTRS to an output of an inverse fast Fourier transform (IFFT) operation used to generate the DFT-s-OFDM symbol.

Some examples of the method, apparatus, and non-transitory computer-readable medium described above may further include processes, features, means, or instructions for initializing the scrambling on a per-subframe basis or a per-symbol basis. In some examples of the method, apparatus, and non-transitory computer-readable medium described above, the initializing may be based at least in part on a function of a cell identifier, a subframe index, a symbol index, or a combination thereof. Some examples of the method, apparatus, and non-transitory computer-readable medium described above may further include processes, features, means, or instructions for assigning scrambled modulation symbols to the second subset based at least in part on an ordering of a port-index, a tone index, a symbol index, or a combination thereof.

Some examples of the method, apparatus, and non-transitory computer-readable medium described above may further include processes, features, means, or instructions for determining that a tone of the second subset may be unused for PTRS. Some examples of the method, apparatus, and non-transitory computer-readable medium described above may further include processes, features, means, or instructions for discarding the modulation symbol corresponding to the tone based at least in part on the determining. In some examples of the method, apparatus, and non-transitory computer-readable medium described above, the first subset or the second subset comprise vacant tones.

Some examples of the method, apparatus, and non-transitory computer-readable medium described above may further include processes, features, means, or instructions for determining a first scrambling sequence for a first receiver and a second scrambling sequence for a second receiver. Some examples of the method, apparatus, and non-transitory computer-readable medium described above may further include processes, features, means, or instructions for assigning the first scrambling sequence or the second scrambling sequence to one or more tones of the second subset based at least in part on transmissions intended for the first receiver or the second receiver.

Some examples of the method, apparatus, and non-transitory computer-readable medium described above may further include processes, features, means, or instructions for initializing the scrambling based at least in part on receiver-specific information, the receiver-specific information comprising at least a radio network temporary identifier (RNTI). Some examples of the method, apparatus, and non-transitory computer-readable medium described above may further include processes, features, means, or instructions for mapping the modulation symbol onto at least one tone of the second subset.

DETAILED DESCRIPTION

Figure 1:
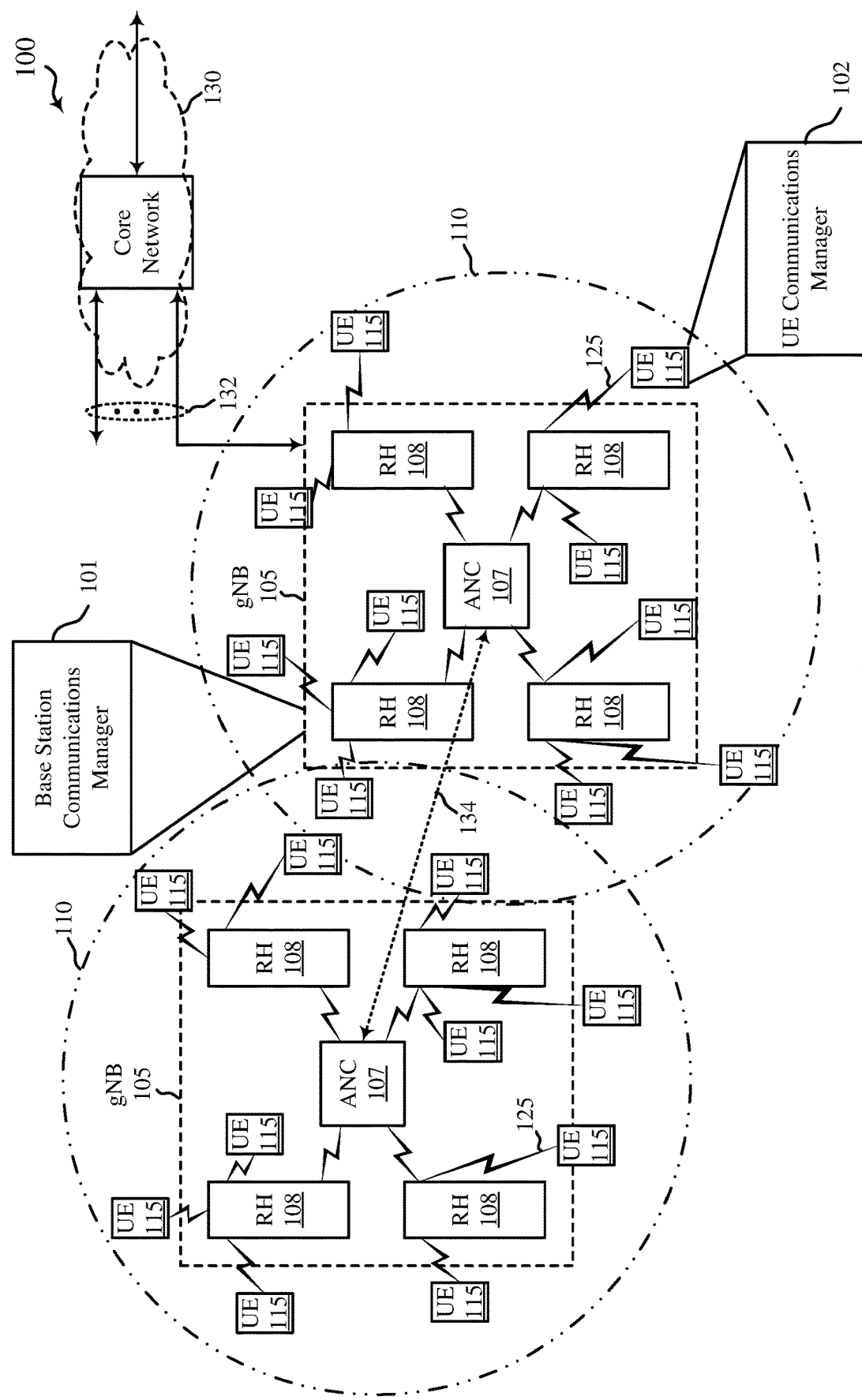
FIG. 1 illustrates an example a wireless communications system that supports enhancements to PTRS design and scrambling in accordance with one or more aspects of the present disclosure.

The described techniques relate to improved methods, systems, devices, and apparatuses that support enhancements to phase-noise compensation reference signals (PCRS) design and scrambling. Generally, the described techniques provide for identification of a DC tone, which may influence transmissions of PCRS (e.g., which may alternatively be referred to as phase-noise tracking reference signals, phase tracking reference signals, or PTRS). It is to be understood that, though described in the context or PTRS collision avoidance, the DC tone indication may be used for other purposes (e.g., multi-user scheduling) without deviating from the scope of the present disclosure.

As an example, transmitting PTRS to avoid collisions with the DC tone may enable improved reception of PTRS by a base station or a UE. In one example, multiple PTRS may be transmitted using sets of resource blocks (RBs), where a frequency for each PTRS within the sets of RBs is different from a frequency corresponding to a DC tone. In another example, time-domain-based PTRS may be used, where a DFT-s-OFDM symbol may include a cyclic prefix and a PTRS appended to a beginning or end of the DFT-s-OFDM symbol. In aspects, a DFT-s-OFDM symbol may alternatively be referred to as a single-carrier frequency division multiplexing (SC-FDM) symbol. Additionally or alternatively, a guard-interval-based DFT-s-OFDM symbol may include a PTRS that replaces part or all of a guard interval. The PTRS may be inserted either before or after the DFT-spreading operation. In some examples, subsets of tones used for PTRS across a system bandwidth may be transmitted using a scrambled modulation symbol, where at least one antenna port may be used for the transmission of PTRS.

In some wireless communications systems, phase noise may impact communications performance. Phase noise levels may increase with higher carrier frequencies, and wireless communications systems that use, for example, carrier frequencies above 6 GHz, may thus be affected by increasing phase noise. Accordingly, a reference signal, such as a PTRS, may be transmitted by a UE and used by a receiver (e.g., a base station) to estimate and correct the phase noise.

Wireless communications systems, such as orthogonal frequency division multiplexing (OFDM) systems, may include transmissions of unmodulated tones or subcarriers that are used by receiving devices to identify a center frequency of transmitted wireless resources (e.g., a DC tone). In aspects of the present disclosure, a UE may identify a DC tone for an uplink transmission and convey an indication of the DC tone to a target base station. For example, the UE may convey the DC tone location using semi-static signaling (e.g., RRC signaling or semi-static uplink control signaling). In some cases, the UE may avoid collisions with the DC tone (e.g., for DMRS and/or PTRS transmissions). For example, PTRS transmissions may collide with the DC tone, preventing receivers from efficiently utilizing the PTRS for phase noise correction. That is, if a frequency for a PTRS (e.g., or a DMRS) is close to, or overlaps with, a frequency corresponding to a DC tone, then PTRS reception on those frequencies may be compromised by a DC offset within the receiver.

In some cases, PTRS transmissions may be scheduled on frequencies different from a frequency or frequencies that corresponds to a DC tone. That is, PTRS may be transmitted within wireless resources (e.g., RBs) using a design that avoids transmitting the PTRS on a same frequency that corresponds to a DC tone. As a result, frequencies used for PTRS transmissions to a receiver may be based on the DC tone, and may avoid interference caused by PTRS frequencies overlapping with the DC tone.

In some examples, scrambling of PTRS tones may be performed according to different schemes, such as a receiver-independent scheme and/or a receiver-specific scheme. In a receiver-independent scheme, even though PTRS transmissions may be directed at a specific receiver to help that receiver correct phase noise, a receiver may also use any PTRS that is scheduled or intended for other receivers. Accordingly, a scrambler may generate a scrambling modulation symbol for every possible PTRS tone across a system bandwidth, enabling receivers to use PTRS that may be scheduled for different receivers. Additionally or alternatively, a receiver may not gain much from using PTRS sent to other receivers, and control information may be to tailored for a PTRS scrambling to be specific to a particular receiver and the receiver's assignment type.

Additionally, a waveform for DFT-s-OFDM may be configured to include a time-domain PTRS. For example, a DFT-s-OFDM symbol may be generated and a cyclic prefix may be appended, followed by a time domain PTRS inserted after the addition of the cyclic prefix, at a start, an end, or both of the DFT-s-OFDM symbol. That is, pre-DFT or post-DFT insertion of PTRS for an uplink DFT-s-OFDM symbol may be supported in accordance with techniques described below.

Aspects of the disclosure are initially described in the context of a wireless communications system. Further examples are then provided that illustrate frequencies used for PTRS in addition to time-domain PTRS transmissions. Aspects of the disclosure are further illustrated by and described with reference to apparatus diagrams, system diagrams, and flowcharts that relate to enhancements to PTRS design and scrambling.

FIG. 1 illustrates an example of a wireless communications system 100 in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a LTE network, a LTE-A network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some cases, UEs 115 may be designed to support critical functions (e.g., mission critical functions), and a wireless communications system 100 may be configured to provide ultra-reliable communications for these functions.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as base station 105 may include subcomponents such as an access network entity 107, which may be an example of an access node controller (ANC). Each access network entity 107 may communicate with a number of UEs 115 through a number of other access network transmission entities 108, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., a set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In multiple-input, multiple-output (MIMO) systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may operate using one or more frequency bands, typically in the range of 300 MHz to 300 GHz. Generally, the region from 300 MHz to 3

GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, MIMO communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode (e.g., or idle mode) when not engaging in active communications, or operating over a limited bandwidth (e.g., according to narrowband communications).

Devices operating in a shared or unlicensed frequency spectrum may perform a clear channel assessment (CCA) prior to communicating in order to determine whether the channel is available. A CCA may include an energy detection procedure to determine whether there are any other active transmissions. For example, the device may infer that a change in a reference signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. UEs 115 and base stations 105 operating in licensed or unlicensed spectrum may transmit discovery reference signals (DRS) to convey information for identifying or establishing a radio connection (e.g., or to facilitate fast transmission of a small cell from a low-power state to an active state).

A reference signal (RS) may be a signal, known to a receiving device, that is inserted into a transmitted signal in order to facilitate channel estimation for coherent de-modulation and measurements. In the downlink, cell-specific RSs may be available to all UEs 115 in a cell; UE-specific RSs may be embedded in the data for specific UEs 115; and multimedia broadcast single frequency network (MBSFN)-specific RSs may be provided in case of MBSFN operation. These RSs may occupy specified resource element (REs) within an OFDM symbol. In some cases, wireless communications using OFDM may make use of a DC subcarrier, referred to herein as a DC tone. The DC tone may be a tone that is unmodulated, and may be used by a receiving device to locate the center of an OFDM frequency band. For example, the DC tone may occupy the center tone of 72 active subcarriers transmitted by a base station 105 to a UE 115.

In some cases, a base station 105 may have prioritized access to a transmission medium within a discovery measurement timing configuration (DMTC) window of its cell. For example, in a CCA-exempt transmission (CET) scheme, a base station 105 may protect its DMTC window using a semi-persistent channel reservation signal. In this scheme, the base station 105 may perform listen-before-talk at power up (e.g., when the cell transissions from a dormant mode to an active mode) and operate using CET thereafter. LBT may be required if periodic transmission of the semi-persistent channel reservation signal is interrupted. Accordingly, aspects of a CET DMTC deployment may resemble operations of a cell within a licensed spectrum. If CET is enabled, a base station 105 associated with a first operator may protect the DMTC window of a base station 105 associated with another operator (e.g., as described with reference to FIG. 3). In some cases, the DMTC windows of base stations 105 belonging to the same network may be coordinated (e.g., may substantially overlap). Alternatively, in a non-CET deployment, the base station may perform a CCA (e.g., using a single, omni-directional signal) before transmitting DRS.

Wireless communications system 100 may enable transmissions of PTRS that enable improved reception of PTRS by receiving devices, such as a UE 115. In one example, multiple PTRS may be transmitted using sets of RBs, where a frequency for each PTRS within the sets RBs is different from a frequency corresponding to a DC tone. In another example, a time-domain-based PTRS may be used, where a DFT-s-OFDM symbol may include a cyclic prefix and a PTRS appended to a beginning or end of the DFT-s-OFDM symbol. Additionally or alternatively, a guard-interval-based DFT-s-OFDM symbol may include a PTRS that replaces part or all of a guard interval, where the replacement may be performed either before (i.e., pre-DFT) or after (i.e., post-DFT) the DFT-spreading operation. In some examples, subsets of tones used for PTRS across a system bandwidth may be transmitted using a scrambled modulation symbol, where at least one antenna port may be used for the transmission of PTRS.

One or more of base stations 105 may include a base station communications manager 101. Similarly UEs 115 may include a UE communications manager 102. Base station communications manager 101 and/or UE communications manager may identify a frequency corresponding to a DC tone within a set of resource blocks and transmit an indication of the identified frequency corresponding to the DC tone. In some cases, one or both of the communications managers may determine a frequency for each of one or more PTRS based at least in part on the DC tone, where each determined frequency is different from the frequency corresponding to the DC tone. One or both of the communications managers may transmit the one or more PTRS using the set of resource blocks based at least in part on the determined frequency. Transmitting the PTRS may include generating a DFT-s-OFDM symbol, appending a cyclic prefix to the symbol, appending a PTRS to the symbol, and transmitting the symbol comprising the PTRS and the cyclic prefix.

Figure 2:
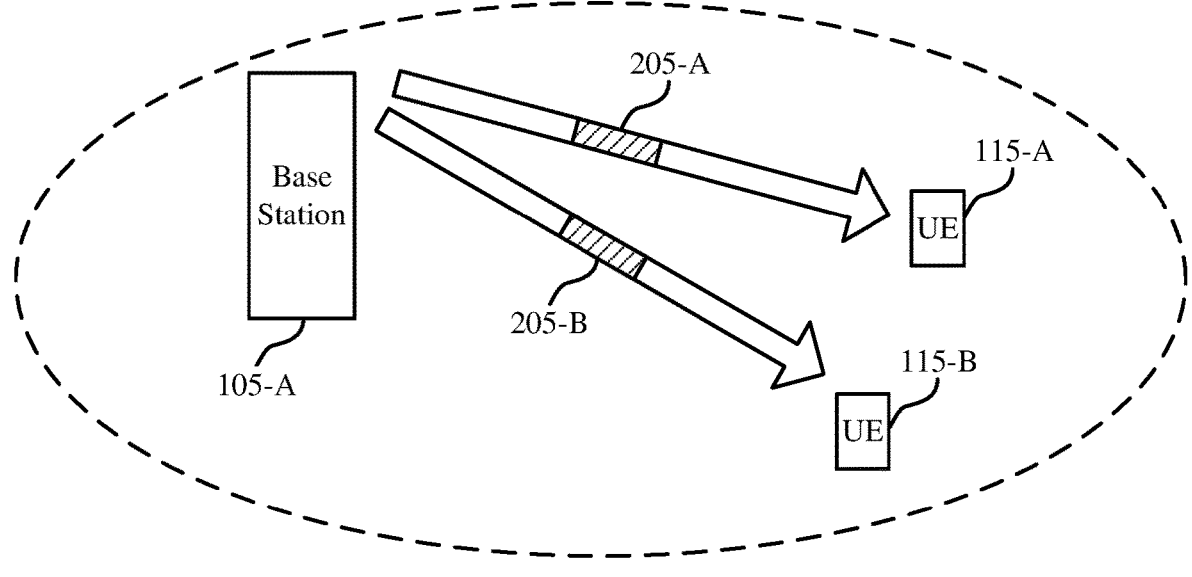
FIG. 2 illustrates an example of a wireless communications system that supports enhancements to PTRS design and scrambling in accordance with one or more aspects of the present disclosure.

FIG. 2 illustrates an example of wireless communications system 200 for enhancements to PTRS design and scrambling in accordance with one or more aspects of the present disclosure. Wireless communications system 200 may include a base station 105-a, and UEs 115-a, 115-b, each of which may be an example of the corresponding device as described with reference to FIG. 1. Wireless communications system 200 may enable receivers to efficiently receive PTRS 205 for phase noise correction. Though aspects of the following are described with reference to downlink transmissions, it is to be understood that the described techniques (e.g., or analogous techniques) may be extended to uplink transmissions without deviating from the scope of the present disclosure.

In wireless communications system 200, phase noise may have an impact on communications performance. Phase noise levels may increase with higher carrier frequencies, and the use of, for example, carrier frequencies above 6 GHz may thus be affected by relatively more phase noise. Accordingly, PTRS 205, may be transmitted by base station 105-a and used by a receiver (e.g., UE 115-a and/or UE 115-b) to estimate and correct the phase noise. Alternatively, PTRS 205 may be transmitted by UE 115-a and/or UE 115-b and used by base station 105-a to estimate and correct phase noise. As an example, PTRS 205 may be transmitted on a certain subset of tones (e.g., frequencies) assigned to UE 115-a and in all symbols (e.g., OFDM symbols) of a subframe. That is, PTRS 205-a may be assigned to UE 115-a, and PTRS 205-b may be assigned to UE 115-b.

A UE 115 (e.g., or a base station 105) may correct for phase noise by tracking a variation in a received signal at these tones over successive symbols. In some cases, different tones may be used for different antenna ports, and tone locations within a set of resources (e.g., an RB) may be fixed. As an example, if an RB includes 12 tones, indexed 0 through 11, then each RB carrying PTRS may carry PTRS at tone indexes 3 and 5, with tone 3 associated with a first antenna port (e.g., port 0) and tone 5 associated with a second antenna port (e.g., port 1).

Wireless communications system 200, may include transmissions of unmodulated tones or subcarriers that are used by UEs 115 to identify a center frequency of transmitted wireless resources (e.g., a DC tone). However, PTRS 205 may collide with the DC tone, preventing receivers from efficiently utilizing PTRS 205 for phase noise correction. For example, if a frequency for a PTRS 205-a is close to, or overlaps with, a frequency corresponding to a DC tone, then PTRS 205-a reception on those frequencies may be compromised by a DC offset within a receiving device.

In some cases, PTRS 205 transmissions may be scheduled on frequencies that are different from a frequency that corresponds to a DC tone. For example, UEs 115-a, 115-b may provide an indication of a DC tone to base station 105-a such that base station 105-*a* schedules the respective PTRS 305 on frequencies that do not conflict with the respective DC tones. Generally, the PTRS 205 tone locations may be based at least in part on a RB assignment. In one example, RBs used for PTRS 205 transmissions may be chosen to exclude the DC tone, such as when PTRS 205 is sparsely transmitted over multiple RBs (e.g., PTRS 205 may only be present in one of every four RBs). For example, in some cases the PTRS 205 frequency density (i.e., the number of tones carrying PTRS 205 in a given portion of a frequency spectrum) may be inversely proportional to the number of RBs scheduled to carry PTRS 205. That is, PTRS 205 may be sparsely transmitted over multiple RBs when a larger number of RBs are scheduled to carry PTRS 205. Similarly, the PTRS 205 time density (i.e., the number of OFDM symbols in a subframe carrying PTRS 205) may be directly proportional to the modulation and coding scheme (MCS). That is, the higher MCS, the higher the PTRS 205 time density.

In another example, the frequencies used for PTRS 205 within each RB of a set of RBs may be chosen to exclude the DC tone, even if PTRS 205 is present in every RB. Additionally or alternatively, different frequencies for PTRS 205 may be used only for RBs that overlap with the DC tone, such as when the placement of PTRS 205 frequencies for RBs that are relatively far from the DC tone may be limiting. In some cases, the frequency corresponding to the DC tone, relative to RBs which may be used for PTRS 205 assignment, may be a function of system information, such as the number of component carriers. An avoidance scheme, e.g., different PTRS 205 locations for RBs containing or overlapping with the DC tone, may also be a function of the system information.

Scrambling of PTRS 205 may be performed according to different schemes, such as a receiver-independent scheme and a receiver-specific scheme. In a receiver-independent scheme, even though PTRS 205 transmissions may be directed at a specific receiver (e.g., PTRS 205-*a* assigned to UE 115-*a*) to help that receiver correct phase noise, a receiver (e.g., UE 115-*b*) may also use PTRS 205-*a* (i.e., a PTRS 205 that is scheduled or intended for other receivers).

For example, phase compensation may be implemented by tracking an evolution of phase noise across successive symbols, where the evolution of phase noise may be independent of a tone index, and UE 115-*a* may accordingly use PTRS 205-*b* sent to UE 115-*b*. In some cases, absolute phases of the PTRS tones sent to different receivers in a same symbol may not be combined in a meaningful way at any one receiver, since a propagation channel and beamforming/precoding on the channels may be different. However, a variation of this phase across time (i.e., across OFDM symbols) may be the same on different tones, and may be combined.

For a UE 115 to use PTRS 205 sent to other receivers, the UE 115 may need to know the structure of those PTRS 205 transmissions, such as which tones are occupied by PTRS 205, the scrambling pattern, etc. However, overhead associated with communicating this information about other receivers can be prohibitively large. Thus, the tone locations and scrambling pattern may be designed to be independent of the receiver. For instance, UE 115-*a* may perform energy detection on tones not assigned to UE 115-*a* to determine whether those tones carry data for UE 115-*b*. If energy is detected, UE 115-*a* may then exploit the known and receiver-independent PTRS 205-*b* structure. In some cases, this may be performed for tones assigned to the receiver, prior to decoding control information that indicates the assigned tones.

In some cases, a PTRS 205 sent to a receiver may not be present on all antenna ports. That is, a number of antenna ports carrying PTRS 205 may be less than a number of antenna ports carrying data, such that the phase noise for a group of data antenna ports may be tracked using a PTRS 205 of a single antenna port. In some cases, antenna ports carrying data may additionally carry DMRS (e.g., which may be used to facilitate demodulation of the data). Accordingly, the number of antenna ports carrying PTRS 205 may also be less than the number of antenna ports carrying DMRS. For example, port 0 may contain PTRS 205 while ports 0 and 1 (e.g., or 1 and 2) may contain DMRS. That is, DMRS ports may be arranged in groups (e.g., ports 1 and 2 may form a DMRS port group), and a given PTRS port (e.g., port 0 or port 1) may be associated with the DMRS port group. In some cases, an antenna port may carry both PTRS and DMRS; alternatively, an antenna port may carry PTRS or DMRS (e.g., but not both). Multiple such DMRS port groups may be formed, with each DMRS port group having an associated PTRS port. For example, a PTRS port may be mapped onto a subcarrier along with one or more DMRS ports of its associated DMRS port group.

In some cases, tones that may be used for PTRS 205 and correspond to the unused antenna ports may be either unused (e.g., vacant tones) or may carry data to the receiver. If the tones are unused, the receiver may perform a PTRS 205 energy detection separately for each port using PTRS tones not assigned to the receiver. If the tones carry data, then the receiver may not be able to distinguish data from PTRS 205 on the tones not assigned to it, unless information about the other receivers is available (which may be prohibitive due to additional signaling). In some examples, if a minimum set of tones/ports are known to always contain PTRS 205, then tones in the set may be used by the receiver, even if the tones are assigned to other receivers. For example, precoding may be used such that transmissions associated with port 0 may be the strongest (e.g., based on a signal-to-noise ratio (SNR)), and may always contain PTRS 205, where port 1 may or may not contain PTRS 205 depending on other factors, such as a receiver assignment. In such cases, port 0 PTRS tones directed to other users may be used by a receiver.

A receiver-independent PTRS scrambling scheme described above may be performed to improve the flexibility of a receiver to receive and use PTRS 205 for phase noise correction. In such cases, a scrambler may generate a scrambling modulation symbol for every possible PTRS tone across a system bandwidth, from every antenna port in every symbol, regardless of whether the tones may be used to carry PTRS 205, data, or is left vacant (e.g., based on which receiver the tone is assigned to). In some cases, receivers that use a subset of the system bandwidth may be informed (e.g., through system information block (SIB) messages) about the whole system bandwidth. Accordingly, such receivers may enable the scrambler to generate and discard a correct number of symbols corresponding to PTRS 205 for the portion of the system bandwidth that the receivers do not use.

In some cases, the scrambler may be initialized on a per-subframe or per-symbol basis. Additionally, an initialization seed may be a function of a cell identifier (ID), a subframe index, or a symbol index. In some examples, the initialization seed may not be a function of receiver-specific information (such as a radio network temporary identifier (RNTI) or a receiver's tone/RB assignment). In some cases, an output of the scrambler output (e.g., a modulation symbol) may be assigned to possible PTRS tones following an ordering of a port index, a frequency (tone) index, and a symbol index. As an example, for each OFDM symbol, the scrambler output may be assigned using an increasing tone index for port 0, then for port 1, and so on. In some cases, different ports may use a same scrambling, or the ports may alternatively use different scrambling to reduce a peak-to-average power ratio (PAPR) increase when precoding is applied. Additionally or alternatively, a same scrambling may be used on all OFDM symbols within a subframe. In some cases, a scrambler output associated with a possible PTRS tone may be discarded if that PTRS tone is not used to carry PTRS 205 (e.g., left vacant, used to carry data, etc.).

In some cases, UE 115-a may not benefit from using PTRS 205-b sent to UE 115-b, because PTRS 205-b may be received at a relatively low SNR. As an example, PTRS 205-b may be transmitted in a radio frequency range associated with directional transmissions to overcome pathloss, such as with transmissions using mmW spectrum, where PTRS 205-b may be sent from base station 105-a with different beamforming weighting from signals intended for UE 115-a (e.g., PTRS 205-a). In some cases, UE 115-a may have to decode control information and determine the tones/RBs assigned to the UE 115-a. Accordingly, this control information may also be used to tailor a PTRS scrambling to be specific to a particular receiver and the receiver's assignment type. In such receiver-specific scrambling schemes, a descrambling generator at the receiver may not have to generate outputs that will be subsequently discarded.

In such receiver-specific PTRS scrambling schemes, a scrambler may scramble modulation symbols only for tones that are designated to carry PTRS 205. The scrambler may be initialized on a per-subframe or per-symbol basis, and an initialization seed may be a function of cell-ID, subframe index, symbol index, and/or receiver-specific information (such as an RNTI or receiver's tone/RB assignment). A scrambler output may be populated onto PTRS tones, following an ordering rule, such as described above for the receiver-independent schemes. Additionally, every scrambler output may be used, since the scrambler outputs may be directly mapped to a specific PTRS tone, and may not be discarded.

Figure 3:
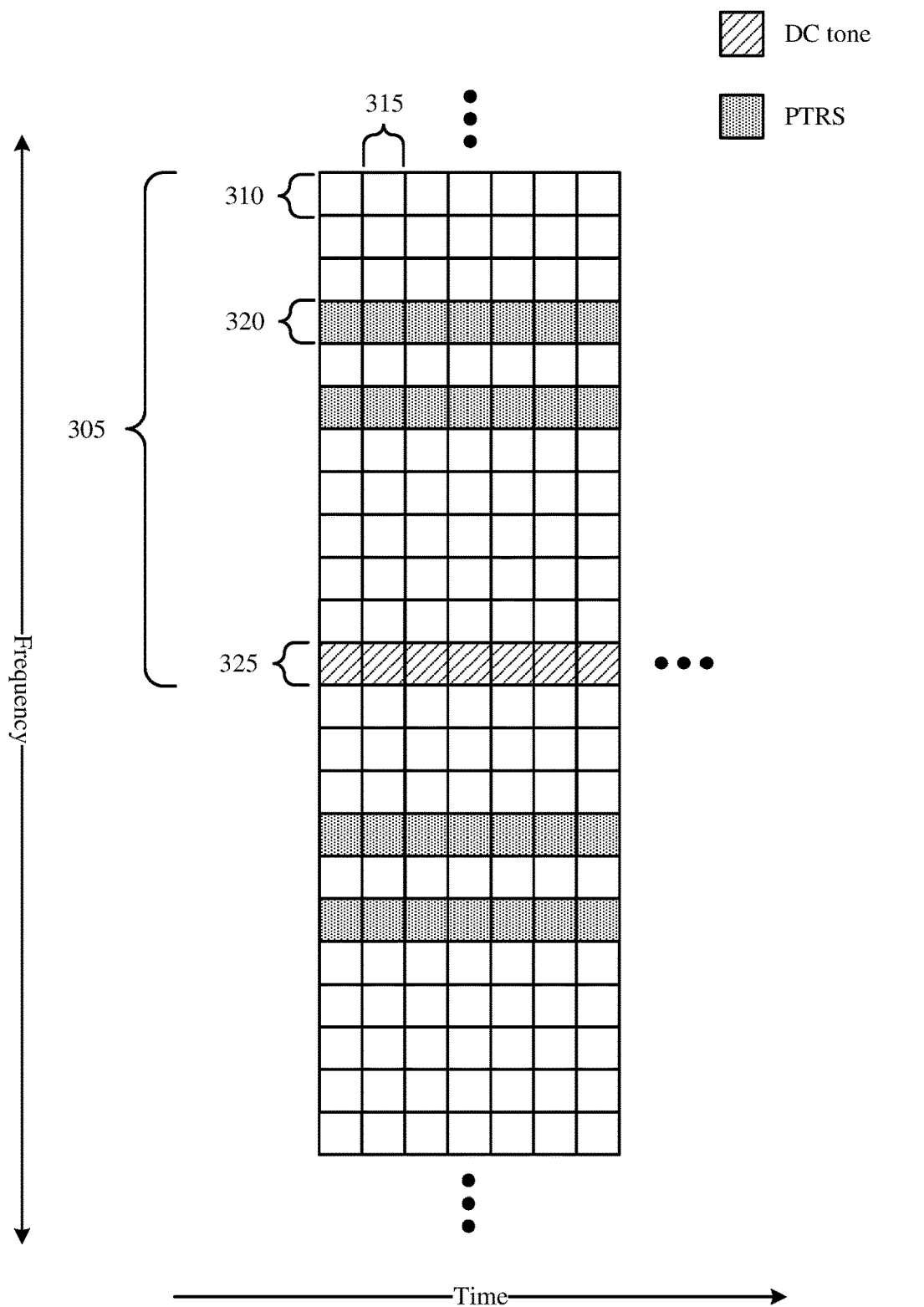
FIG. 3 illustrates an example of wireless resources in a system that supports enhancements to PTRS design and scrambling in accordance with one or more aspects of the present disclosure.

FIG. 3 illustrates an example of wireless resources 300 in a system that supports enhancements to PTRS design and scrambling in accordance with one or more aspects of the present disclosure. Wireless resources 300 may illustrate an example of determining frequencies for PTRS transmissions that do not overlap with a DC tone. As described above, it is to be understood that though PTRS transmissions are used for the sake of example, the described techniques may extend to other reference signals as well (e.g., DMRS).

Wireless resources 300 may include a number of RBs 305, that include a number of subcarriers 310 transmitted over a number of symbols 315. Subcarriers 310 may be used for, or may be associated with, transmissions by different antenna ports, and subcarrier locations within RB 305 may be fixed. As an example, an RB 305 may include 12 subcarriers 310 (tones), indexed 0 through 11, and each RB 305 may carry PTRS 320 at tone indexes 3 and 5, with tone 3 associated with a first antenna port (e.g., port 0) and tone 5 associated with a second antenna port (e.g., port 1).

In some cases, RBs 305 used for PTRS transmissions may be chosen to exclude a DC tone 325 (e.g., an unmodulated tone used by a receiver to identify a center frequency of wireless resources 300). For example, a PTRS 320 may not be transmitted in each RB 305 assigned to a receiver, and any RBs 305 that do not include (or do not overlap with) the DC tone 325, may be chosen to carry PTRS 320. In some cases, a UE 115 may indicate a location of the DC tone 325 to a transmitting device (e.g., a base station 105) to facilitate efficient transmission of PTRS 320 or to provide other benefits to the communications system.

In another example, the frequencies used for PTRS 320 within each RB 305 of a set of RBs 305 may be chosen to exclude the DC tone 325, even if PTRS 320 is present in every RB 305. That is, when DC tone 325 is present in an RB 305, the frequencies corresponding with PTRS 320 may be different from the frequencies corresponding to DC tone 325. Additionally or alternatively, different frequencies for PTRS 320 may be used only for RBs 305 that overlap with the DC tone 325. For instance, wireless resources may include multiple RBs 305, and only an RB 305 that overlaps with DC tone 325 may include PTRS 320 on frequencies that are different from DC tone 325. Accordingly, PTRS 320 may only be transmitted in the RB 305 that overlaps with DC tone 325 (e.g., should transmitting PTRS 320 in other RBs 305 be limiting in any way), where the other RBs 305 may be relatively farther away from DC tone 325.

FIGS. 4A through 4D illustrate examples of DFT-s-OFDM symbol configurations 401 through 404 in a system that supports enhancements to PTRS design and scrambling in accordance with one or more aspects of the present disclosure. In some cases, a DFT-s-OFDM waveform may be generated by using a frequency-contiguous tone assignment and performing a DFT operation on input modulation symbols prior to assigning the symbols to tones. In aspects of the present disclosure, a DFT-s-OFDM waveform may support pre-DFT PTRS insertion. Additionally, PTRS may be transmitted using additional tones besides those populated from the DFT output. The additional tones may be placed adjacent to data tones, or interspersed between the data tones.

A PTRS sequence transmitted in the time domain may be desirable. PTRS sequences in accordance with one or more of the described DFT-s-OFDM symbol configurations 401 through 404 may improve system performance for wireless communications systems in which phase noise changes rapidly. The described configurations may apply to wireless communications systems associated with directional transmissions in which a high order MCS is used (e.g., such that dynamic and accurate correction of phase-noise may improve decoding of such symbols). That is, DFT-s-OFDM configurations 401 through 404 may enable phase-noise correction on a per-symbol basis (or some other suitable time interval), which may, for example, be especially useful in the case of data transmissions that are sent using a high order MCS (e.g., in high SNR environments).

Figure 4A:
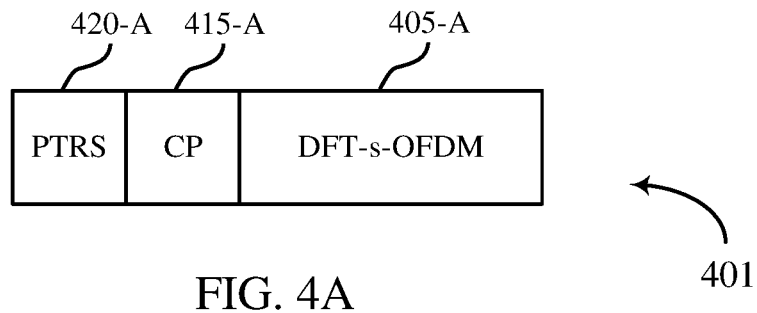
FIGS. 4A through 4D illustrate examples of DFT-s-OFDM symbol configurations in a system that supports enhancements to PTRS design and scrambling in accordance with one or more aspects of the present disclosure.
Figure 4B:
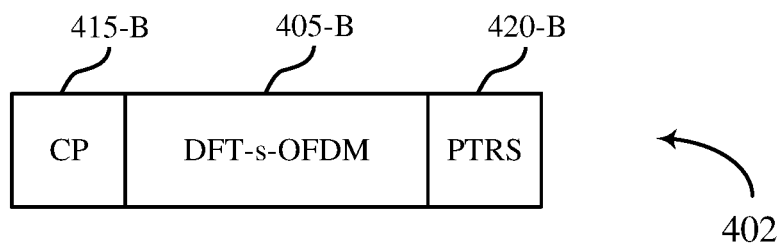

In the illustrative example provided in FIG. 4A, DFT-s-OFDM symbol 405-a may be generated by a transmitting device, and cyclic prefix 415-a may be subsequently appended at the beginning of DFT-s-OFDM symbol 405-a. Additionally, PTRS 420-a may be appended at a beginning of cyclic prefix 415-a. Additionally or alternatively, a PTRS may be appended to the end of a DFT-s-OFDM symbol. For instance, in the example provided in FIG. 4B, DFT-s-OFDM symbol 405-b may be generated, and cyclic prefix 415-b may be subsequently appended at the beginning of DFT-s-OFDM symbol 405-b. Additionally, PTRS 420-b may be appended at an end of DFT-s-OFDM symbol 405-b.

Figure 4C:
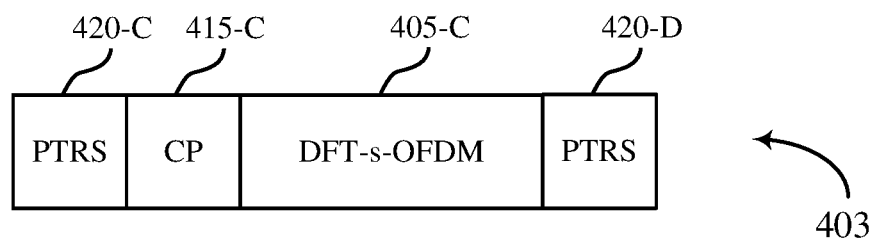

In the example provided in FIG. 4C, a PTRS 420-c may be appended to the beginning and the end of a DFT-s-OFDM symbol 405-c. For instance, DFT-s-OFDM symbol 405-c may be generated, and cyclic prefix 415-*c* may be subsequently appended at the beginning of DFT-s-OFDM symbol 405-*c*. PTRS 420-*c* may then be appended at a beginning of cyclic prefix 415-*c*, and PTRS 420-*d* may be appended at the end of DFT-s-OFDM symbol 405-*c*.

Figure 4D:
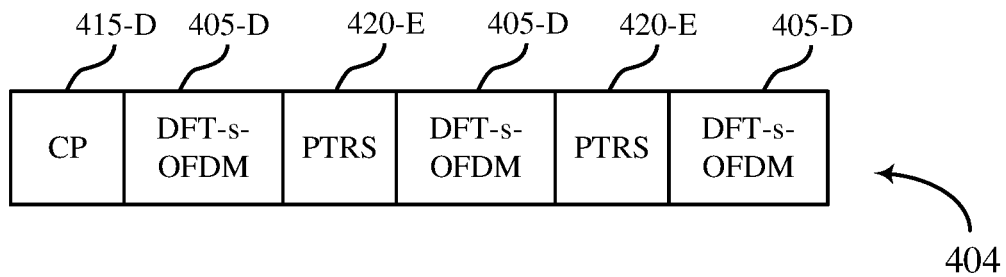

In the example provided in FIG. 4D, a PTRS 420-*e* is inserted at multiple points within the DFT-s-OFDM symbol 405-*d*. For instance, DFT-s-OFDM symbol 405-*d* may be generated, and cyclic prefix 415-*d* may be subsequently appended at the beginning of DFT-s-OFDM symbol 405-*d*. PTRS 420-*e* may be inserted at multiple points within the DFT-s-OFDM symbol 405-*d* (e.g., in addition to or instead of appending the PTRS to the beginning and/or end of the symbol). For example, such insertion may be achieved by inserting the PTRS prior to the DFT spreading operation (e.g., as described with reference to FIG. 6). For example, the PTRS 420-*e* may be segmented and the various segments may be mapped to input positions of the DFT spreading operation to generate the DFT-s-OFDM symbol 405-*d*.

In some examples, a weighted-overlap-and-add (WOLA) scheme may be used between successive DFT-s-OFDM symbols. For example, multiple symbols according to DFT-s-OFDM symbol configurations 401, 402, 403, and/or 404 may be transmitted, where a WOLA scheme may be used between consecutive DFT-s-OFDM symbols. Additionally, the WOLA scheme may be used during the appending of the PTRS 420 to the DFT-s-OFDM symbols 405 with cyclic prefix 415, as described above.

Figure 5:
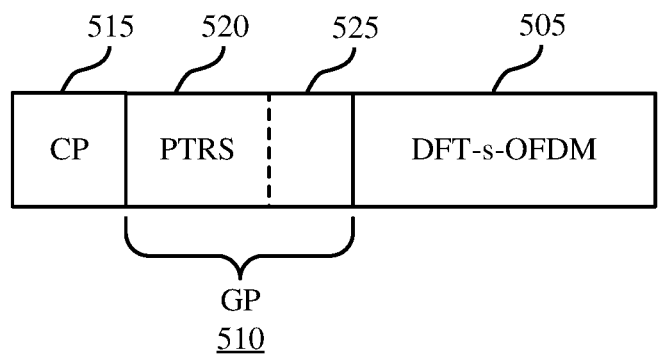
FIG. 5 illustrates an example of another DFT-s-OFDM symbol configuration in a system that supports enhancements to PTRS design and scrambling in accordance with one or more aspects of the present disclosure.

FIG. 5 illustrates an example of an DFT-s-OFDM symbol configuration 500 for enhancements to PTRS design and scrambling in accordance with one or more aspects of the present disclosure. DFT-s-OFDM symbol configuration 500 may be an example of a guard-interval-based DFT-s-OFDM symbol used for transmission of PTRS.

Some wireless communications systems may use a guard-interval based DFT-s-OFDM symbol, such as DFT-s-OFDM symbol 505, where zeros are included at the beginning and/or at the end of an input to a DFT-spreading operation. Accordingly, a time-domain DFT-s-OFDM symbol waveform may have a low amplitude at the beginning and/or at the end. Such time-domain blanking may serve as a replacement for a cyclic prefix, and the blank period, or a portion of it, may also be replaced by a fixed, non-zero, time-domain waveform that may serve as a time-domain PTRS 520. However, this scheme may not allow for a system in which some receivers use OFDM waveforms (e.g., including a cyclic prefix) and other receivers use DFT-s-OFDM waveforms (e.g., including a guard-interval, but no cyclic prefix).

DFT-s-OFDM symbol configuration 500 may include the retention of cyclic prefix 515 and further introduces a PTRS 520 (e.g., a time-domain PTRS). For example, a guard interval-based DFT-s-OFDM symbol 505 may be generated in the time domain using zero-insertion, DFT-spreading, and inverse fast Fourier transform (IFFT), where DFT-s-OFDM symbol configuration 500 includes guard period 510. Subsequently, part or all of the guard period 510 may be replaced with PTRS 520. In some cases, should PTRS 520 only occupy a portion of guard period 510, a portion 525 of guard period 510 may remain.

In such cases, the resulting composite time-domain waveform may be treated as a single DFT-s-OFDM symbol prior to insertion of a cyclic prefix 515, where the cyclic prefix 515 may be appended to the DFT-s-OFDM symbol 505 and the guard period 510 (e.g., including the PTRS 520). In one example, PTRS 520 may be inserted after an addition of cyclic prefix 515, or may be inserted at a start or end (or both) of DFT-s-OFDM symbol 505. In some cases, appending PTRS 520 may optionally be accomplished using a WOLA scheme at an insertion point.

Figure 6:
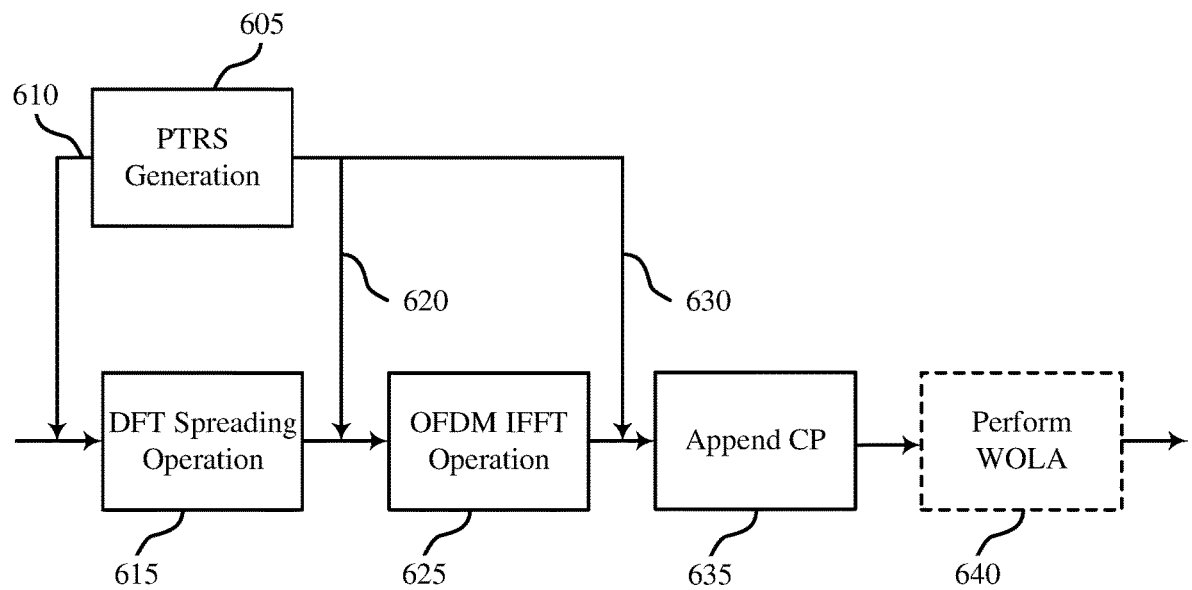
FIGS. 6 through 9 illustrate examples of process flows in a system that supports enhancements to PTRS design and scrambling in accordance with one or more aspects of the present disclosure.

FIG. 6 illustrates an example of a process flow 600 that supports enhancements to PTRS design and scrambling in accordance with one or more aspects of the present disclosure. Process flow 600 may be performed by a wireless device (e.g., a UE 115 or a base station 105). At 605, the wireless device may generate a PTRS. As illustrated by 610, the PTRS may in some cases serve as an input to a DFT spreading operation at 615 (e.g., which may be referred to as pre-DFT insertion). Alternatively the PTRS may be inserted after the DFT spreading operation (e.g., which may be referred to as post-DFT insertion). For example, as illustrated by 620, the PTRS may be appended in the frequency domain (e.g., following the DFT spreading operation at 615 but preceding the OFDM IFFT operation at 625). In another example, as illustrated by 630, the PTRS may be appended to the DFT-s-OFDM symbol generated by the OFDM IFFT operation at 625. At 635, the wireless device may append a CP, and at 640 the wireless device may optionally perform WOLA.

Figure 7:
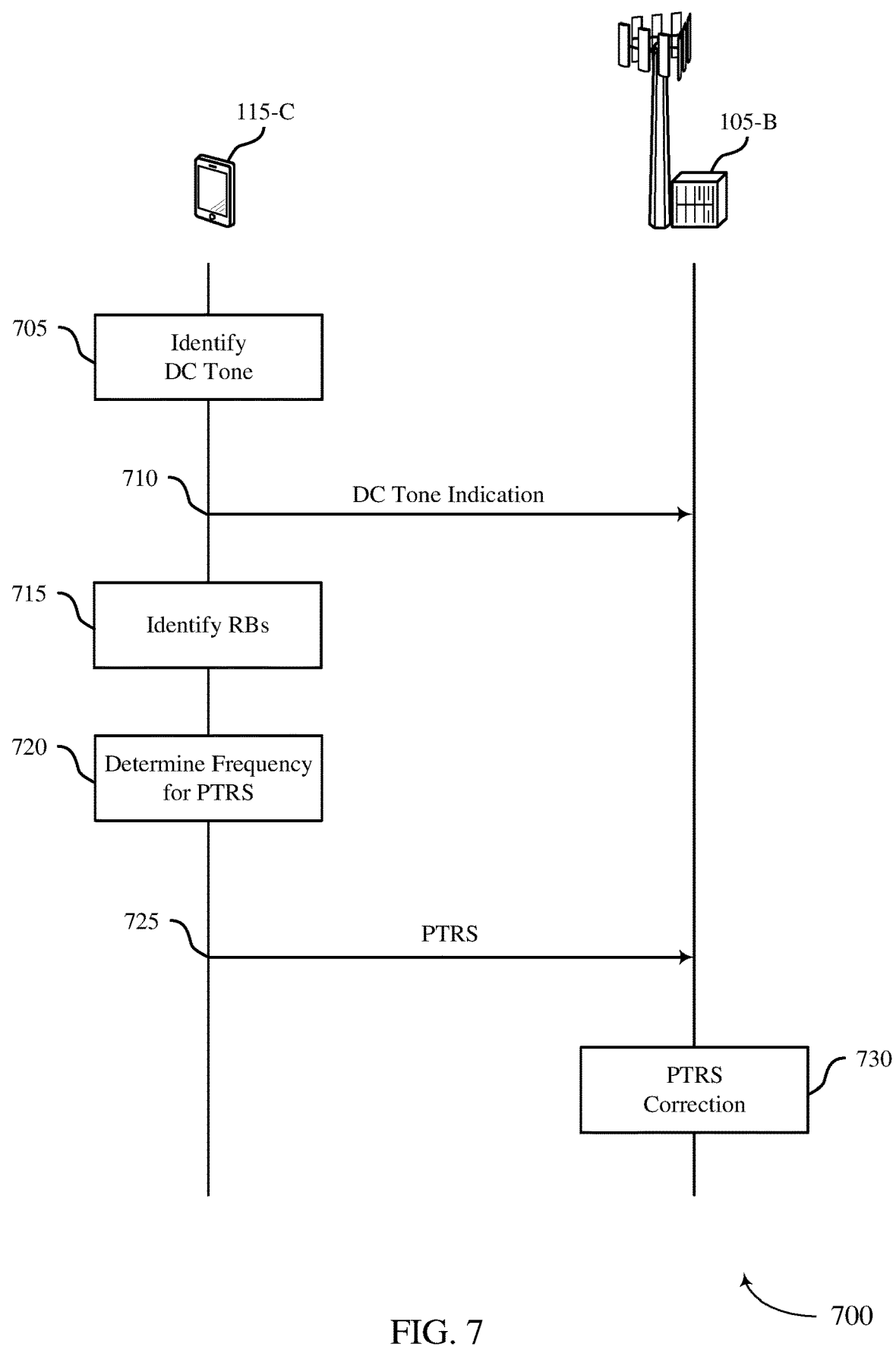

FIG. 7 illustrates an example of a process flow 700 in a system that supports enhancements to PTRS design and scrambling in accordance with one or more aspects of the present disclosure. Process flow 700 includes a UE 115-*c* and a base station 105-*b*, which may be examples of the corresponding devices described with reference to FIGS. 1 and 2. Process flow 700 may illustrate the transmission of PTRS on frequencies that do not overlap with a DC tone.

At 705, UE 115-*c* may identify a frequency corresponding to a DC tone within a set of RB s. In some cases, UE 115-*c* may transmit an indication of the identified frequency corresponding to the DC tone to base station 105-*b* at 710. For example, the indication may be conveyed via uplink control signaling, RRC signaling, or some other semi-static signaling. In aspects, the identified DC tone may affect various communication parameters. For example, the identified DC tone may impact the location of PTRS (e.g., or other reference signals such as DMRS as described above), scheduling decisions made by base station 105-*b*, etc. In some cases, the DC tone location may change (e.g., based on UE implementation). For example, when an additional component carrier is added (e.g., or dropped), the DC tone location may change such that there may be a mechanism (e.g., a configuration message) to indicate the change in DC tone location.

At 715, UE 115-*c* may identify that a subset of the set of RBs includes at least some of the one or more PTRS. In some cases, UE 115-*c* may identify that each RB of the set of RBs includes at least some of the one or more PTRS, and may assign the one or more PTRS to a frequency of each RB that is different from the frequency corresponding to the DC tone. Additionally or alternatively, UE 115-*c* may identify that a certain RB of the set of RBs overlaps with the DC tone, and may assign the one or more PTRS to a frequency of the identified RB that is different from the frequency corresponding to the DC tone. In some cases, the frequency corresponding to each of the one or more PTRS is based at least in part on a number of component carriers, a system bandwidth, or both. For example, a PTRS may be transmitted in a system using carrier aggregation, and the frequency chosen for PTRS transmission may be based on respective resources used for a primary and secondary component carrier.

At 720, UE 115-*c* may determine a frequency for each of one or more PTRS based at least in part on the DC tone, where the determined frequency is different from the frequency corresponding to the DC tone. In some examples, UE 115-c may optionally transmit an indication of the identified DC tone to base station 105-b at 720. In such cases, base station 105-b may use the indication to identify the DC tone within resources transmitted by UE 115-c.

At 725, UE 115-c may transmit, and base station 105-b may receive, the one or more PTRS using the set of RBs based at least in part on the determined frequency. In some cases, the one or more PTRS may be transmitted using one or more RBs that are different from a RB including the DC tone. At 730, base station 105-b may perform phase noise correction based at least in part on one or more received PTRS.

Figure 8:
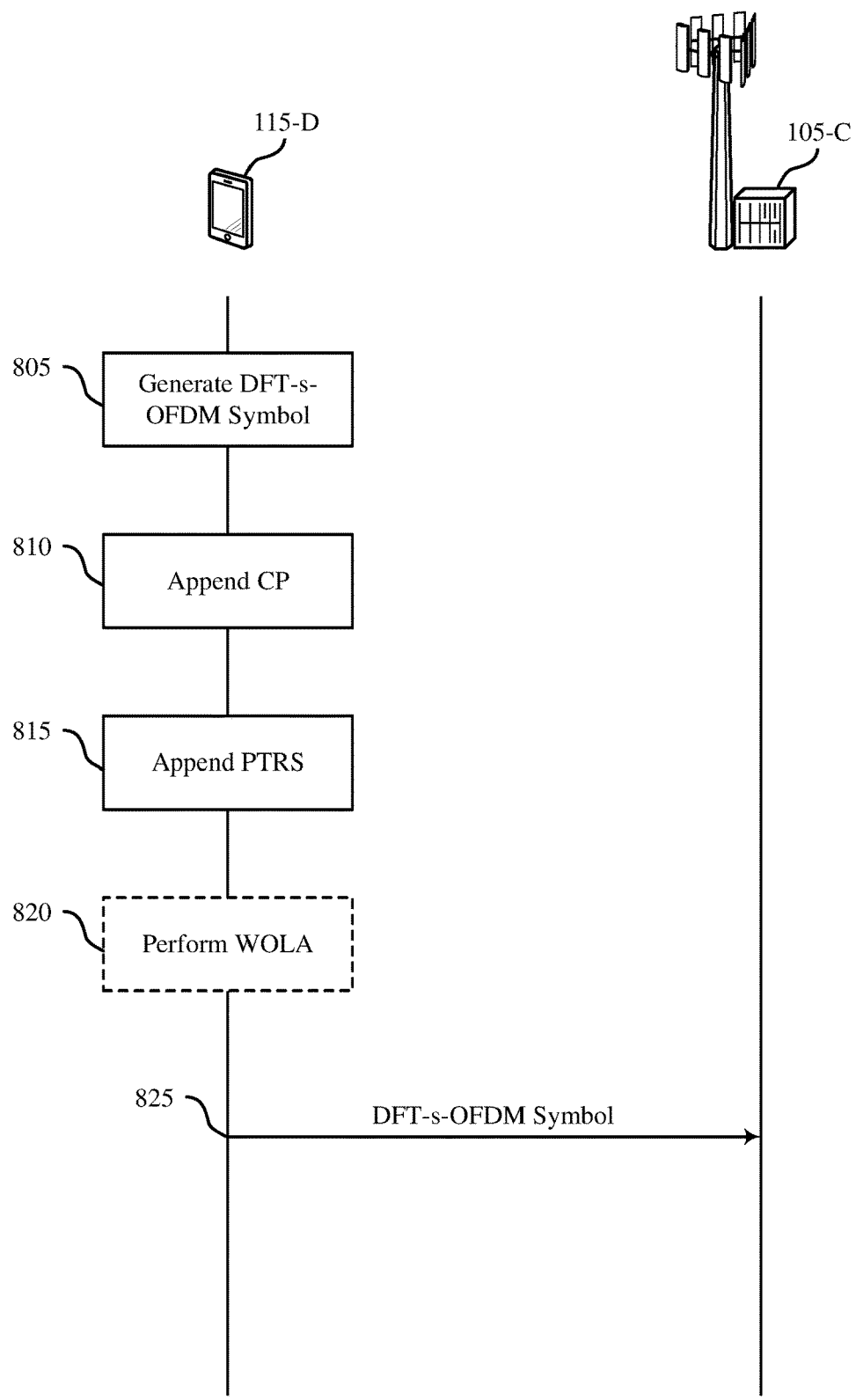

FIG. 8 illustrates an example of a process flow 800 in a system that supports enhancements to PTRS design and scrambling in accordance with one or more aspects of the present disclosure. Process flow 800 includes a UE 115-d and a base station 105-c, which may be examples of the corresponding devices described with reference to FIGS. 1 and 2. Process flow 800 may illustrate an example of appending a PTRS to an DFT-s-OFDM symbol.

At 805, UE 115-d may generate a DFT-s-OFDM symbol. In some examples, the generated DFT-s-OFDM symbol may include a guard interval. At 810, UE 115-d may append a cyclic prefix to the generated DFT-s-OFDM symbol followed by appending a PTRS at 815. In some cases, the cyclic prefix is appended to the beginning of the generated DFT-s-OFDM symbol and the PTRS is appended to a beginning of the cyclic prefix, to an end of the generated DFT-s-OFDM symbol, or a combination thereof. In some examples, appending the PTRS to the generated DFT-s-OFDM symbol includes replacing at least a portion of the guard interval with the PTRS.

At 820, UE 115-d may optionally perform a WOLA scheme for a second DFT-s-OFDM symbol associated with the generated DFT-s-OFDM symbol, the second DFT-s-OFDM symbol including a second cyclic prefix and a second PTRS. For example, UE 115-d may generate multiple DFT-s-OFDM symbols as describe above, and may perform the WOLA scheme at a boundary between the DFT-s-OFDM symbols. Additionally or alternatively, the WOLA scheme may be performed within the generated DFT-s-OFDM symbol at a boundary between the generated DFT-s-OFDM symbol and the appended PTRS. In some examples, the WOLA scheme may be performed both within the DFT-s-OFDM symbols and between subsequent symbols. At 825, UE 115-d may transmit, and base station 105-c may receive, the generated DFT-s-OFDM symbol including the cyclic prefix and the PTRS. It is to be understood that though aspects of the preceding example are described with reference to uplink transmissions, in some cases analogous techniques may be extended to downlink transmissions without deviating from the scope of the present disclosure.

Figure 9:
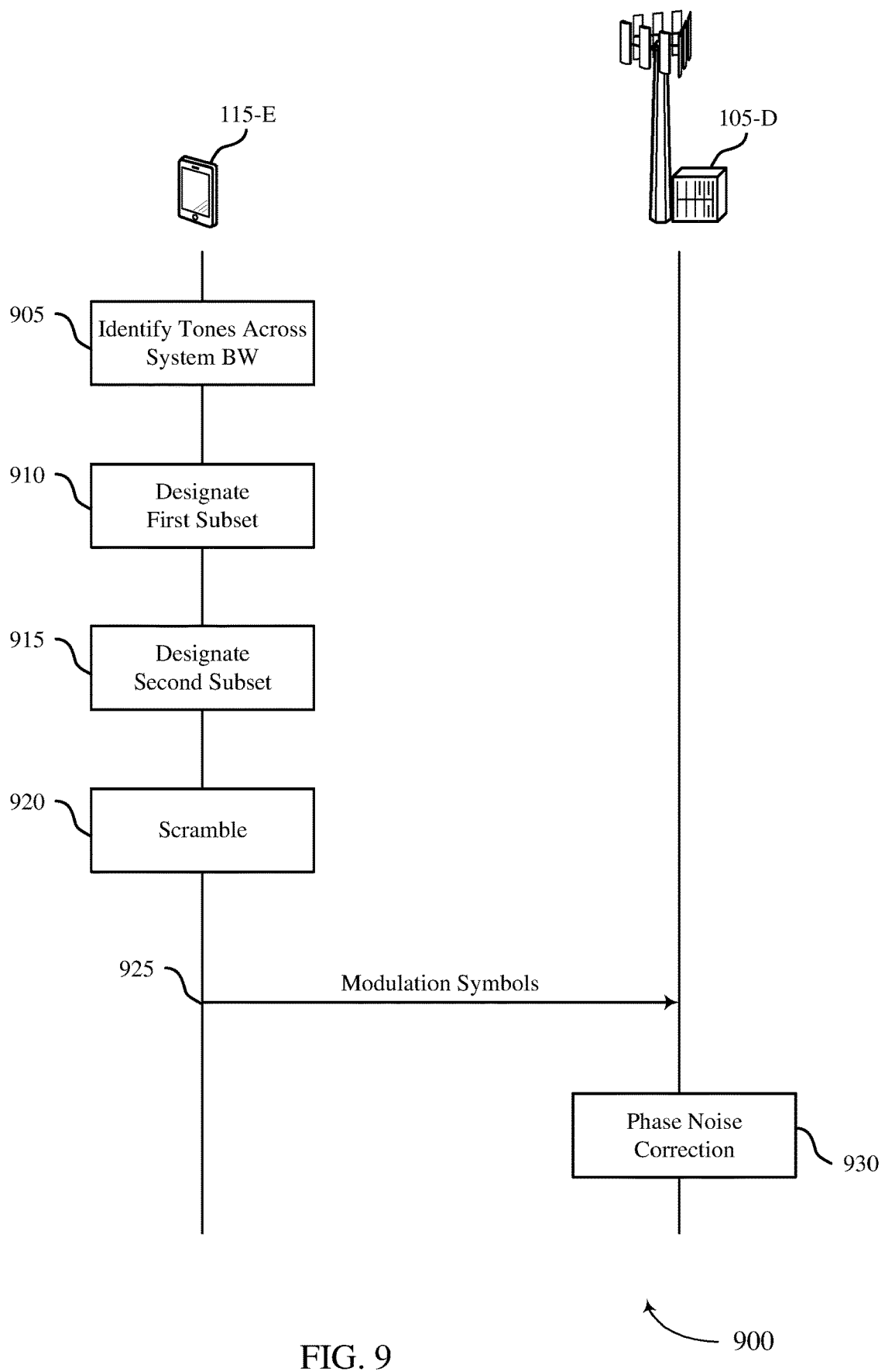

FIG. 9 illustrates an example of a process flow 900 in a system that supports enhancements to PTRS design and scrambling in accordance with one or more aspects of the present disclosure. Process flow 900 includes a UE 115-e and a base station 105-d, which may be examples of the corresponding devices described with reference to FIGS. 1 and 2. Process flow 900 may illustrate an example of scrambling modulation symbols across a system bandwidth for the transmission of PTRS.

At 905, UE 115-e may identify multiple tones across a system bandwidth (e.g., or a set of RBs), where the tones correspond to multiple symbols across the system bandwidth and are associated with at least one antenna port. At 910, base station UE 115-e may assign a first subset of the tones for data. At 915, base station UE 115-e may assign a second subset of the tones for PTRS. In some cases, the second subset corresponds to an antenna port of the at least one antenna port. In some cases, UE 115-e may assign modulation symbols to the second subset based at least in part on an ordering of a port-index, a tone index, a symbol index, or a combination thereof. In some cases, the first subset or the second subset include one or more vacant tones.

At 920, base station UE 115-e may scramble a modulation symbol for each tone of the second subset. In some cases, the scrambling may be initialized on a per-subframe basis or a per-symbol basis, and the initializing may be based on a function of a cell identifier, a subframe index, a symbol index, or a combination thereof.

At 925, base station UE 115-e may transmit, and base station 105-d may receive, the first subset and the second subset using the scrambled modulation symbols. In some cases, transmitting the modulation symbol may include transmitting the second subset using the at least on antenna port based at least in part on a RB assignment, the RB assignment including at least a number of layers used for data in a RB. At 930, base station 105-d may perform phase noise correction based at least in part on the received PTRS associated with the scrambled modulation symbols. It is to be understood that though aspects of the preceding example are described with reference to uplink transmissions, in some cases analogous techniques may be extended to downlink transmissions without deviating from the scope of the present disclosure.

Figure 10:
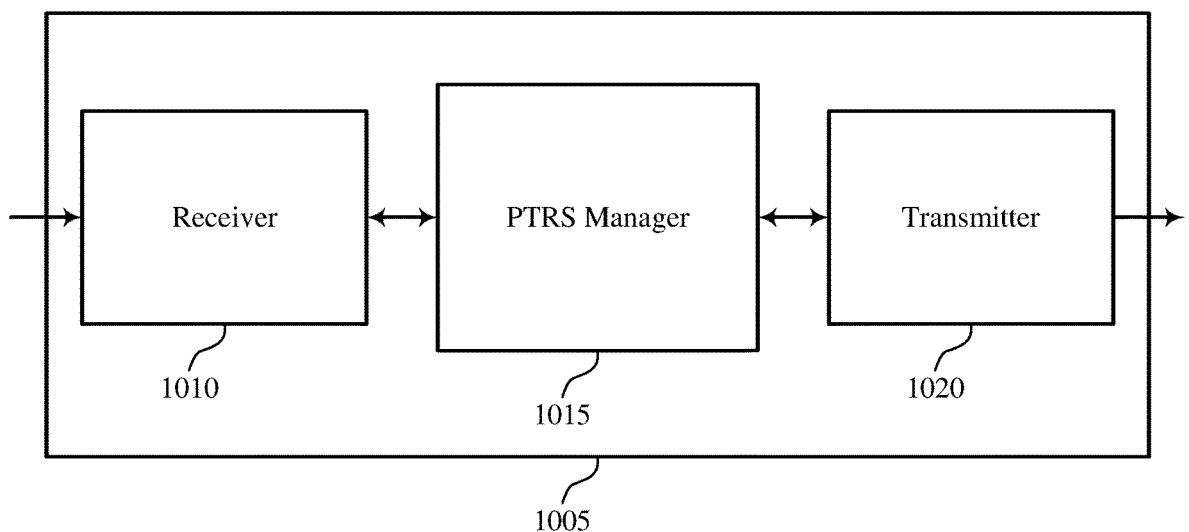
FIGS. 10 through 12 show block diagrams of a device that supports enhancements to PTRS design and scrambling in accordance with one or more aspects of the present disclosure.

FIG. 10 shows a block diagram 1000 of a wireless device 1005 that supports enhancements to phase-noise compensation reference signal design and scrambling in accordance with aspects of the present disclosure. Wireless device 1005 may be an example of aspects of a UE 115 or a base station 105 as described herein. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to enhancements to phase-noise compensation reference signal design and scrambling, etc.). Information may be passed on to other components of the device. The receiver 1010 may be an example of aspects of the transceiver 1335 described with reference to FIG. 13. The receiver 1010 may utilize a single antenna or a set of antennas.

Communications manager 1015 may be an example of aspects of the communications manager 1315 described with reference to FIG. 13. Communications manager 1015 and/or at least some of its various sub-components may be implemented in hardware, software executed by a processor, firmware, or any combination thereof. If implemented in software executed by a processor, the functions of the communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 1015 and/or at least some of its various sub-components may be physically located at various positions, including being distributed such that portions of functions are implemented at different physical locations by one or more physical devices. In some examples, communications manager 1015 and/or at least some of its various sub-components may be a separate and distinct component in accordance with various aspects of the present disclosure. In other examples, communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1015 may identify a frequency corresponding to a DC tone within a set of resource blocks. Communications manager 1015 may determine a frequency for each of one or more PTRS based at least in part on the DC tone, each determined frequency different from the frequency corresponding to the DC tone. Communications manager 1015 may transmit the one or more PTRS using the set of resource blocks based at least in part on the determined frequency. The communications manager 1015 may also generate a DFT-s-OFDM symbol, append a cyclic prefix to the generated DFT-s-OFDM symbol, append a PTRS to the generated DFT-s-OFDM symbol, and transmit the generated DFT-s-OFDM symbol including the cyclic prefix and the PTRS.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
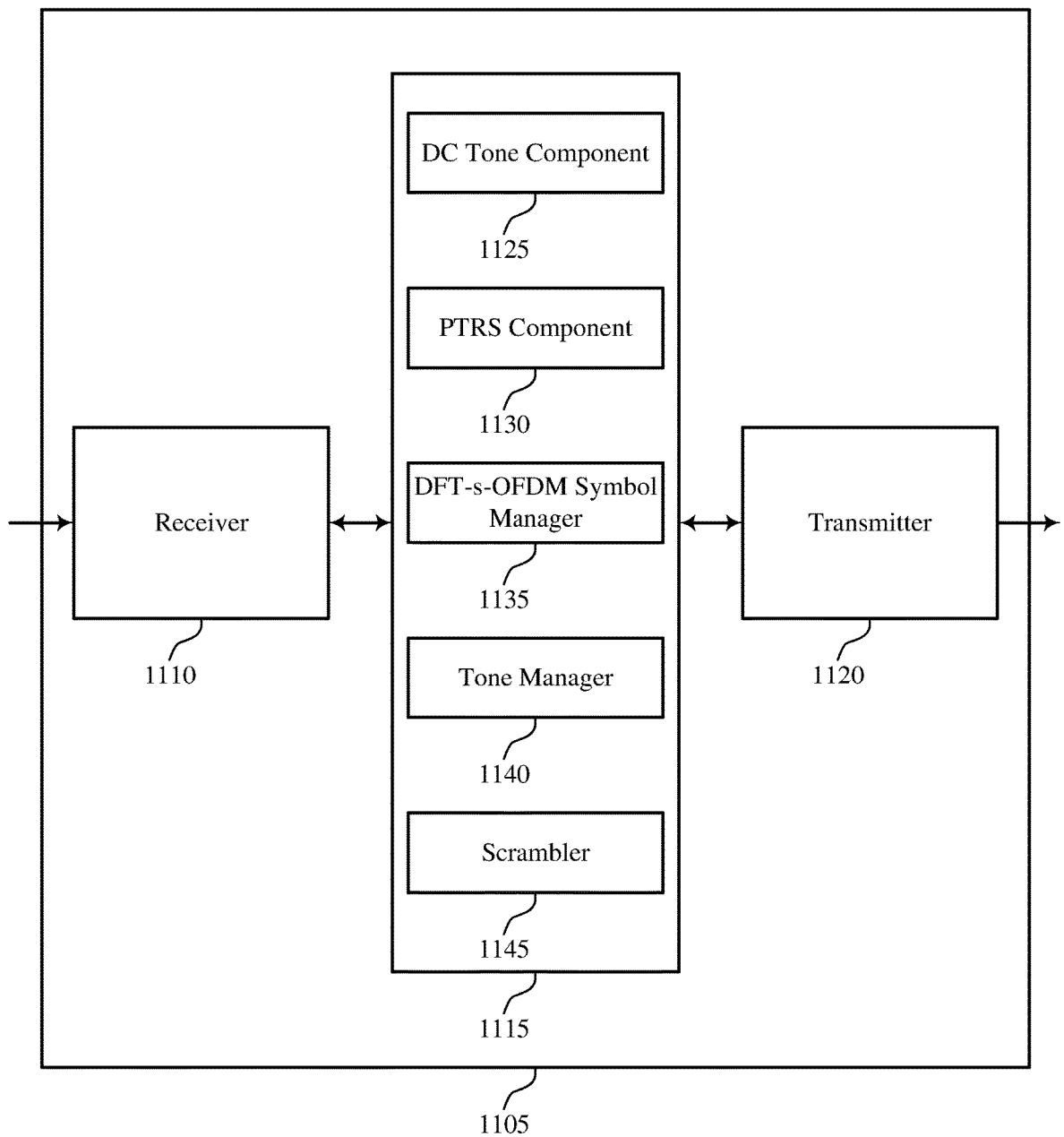

FIG. 11 shows a block diagram 1100 of a wireless device 1105 that supports enhancements to phase-noise compensation reference signal design and scrambling in accordance with aspects of the present disclosure. Wireless device 1105 may be an example of aspects of a wireless device 1005 or a UE 115 or a base station 105 as described with reference to FIG. 10. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to enhancements to phase-noise compensation reference signal design and scrambling, etc.). Information may be passed on to other components of the device. The receiver 1110 may be an example of aspects of the transceiver 1335 described with reference to FIG. 13. The receiver 1110 may utilize a single antenna or a set of antennas.

Communications manager 1115 may be an example of aspects of the communications manager 1315 described with reference to FIG. 13. Communications manager 1115 may also include DC tone component 1125, PTRS component 1130, DFT-s-OFDM symbol manager 1135, tone manager 1140, and scrambler 1145.

DC tone component 1125 may identify a frequency corresponding to a DC tone within a set of resource blocks and transmit an indication of the identified frequency corresponding to the DC tone. DC tone component 1125 may identify that a resource block of the set of resource blocks overlaps with the DC tone, where the one or more PTRS are transmitted using one or more resource blocks of the set of resource blocks that are different from the resource block including the DC tone. DC tone component 1125 may identify that a first resource block of the set of resource blocks overlaps with the DC tone, where the determining includes assigning at least some of the one or more PTRS to one or more frequencies of the first resource block PTRS component 1130 may determine a frequency for each of one or more PTRS based on the DC tone, each determined frequency different from the frequency corresponding to the DC tone. PTRS component 1130 may append a PTRS to the generated DFT-s-OFDM symbol. PTRS component 1130 may assign the one or more PTRS to a frequency of each RB that is different from the frequency corresponding to the DC tone. PTRS component 1130 may transmit the one or more PTRS using the set of resource blocks based on the determined frequency. In some cases, the frequency corresponding to each of the one or more PTRS is based on a number of component carriers, a system bandwidth, or both. PTRS component 1130 may determine that a tone of the second subset is unused for PTRS, and discard the modulation symbol corresponding to the tone based on the determining. PTRS component 1130 may identify that each resource block of the set of resource blocks includes at least some of the one or more PTRS, where the determining is based on identifying that each resource block includes at least some of the one or more PTRS. In some cases, a frequency density of the PTRS is based on a number of resource blocks in the set of resource blocks.

DFT-s-OFDM symbol manager 1135 may generate a DFT-s-OFDM symbol and append a cyclic prefix to the generated DFT-s-OFDM symbol. In some cases, the cyclic prefix is appended to the beginning of the generated DFT-s-OFDM symbol and the PTRS is appended to a beginning of the cyclic prefix, to an end of the generated DFT-s-OFDM symbol, or a combination thereof. In some cases, the generated DFT-s-OFDM symbol includes a guard interval, and appending the PTRS to the generated DFT-s-OFDM symbol includes replacing at least a portion of the guard interval with the PTRS. The replacing may be performed either before or after the DFT-spreading operation. For example, the guard interval itself may be created by insertion of zeroes at the beginning and/or end of the input to the DFT-spreading operation. Pre-DFT PTRS insertion may correspond to replacing some or all of these zeros with the PTRS signal (e.g., such that pre-DFT insertion may generally place PTRS at some subset of the inputs to the DFT-spreading operation). Alternatively, DFT-s-OFDM symbol manager 1135 may append the PTRS to an output of an IFFT OFDM operation (e.g., prior to appending a cyclic prefix). DFT-s-OFDM symbol manager 1135 may perform a weighted-overlap-and-add scheme for a second DFT-s-OFDM symbol associated with the generated DFT-s-OFDM symbol, the second DFT-s-OFDM symbol including a second cyclic prefix and a second PTRS. DFT-s-OFDM symbol manager 1135 may transmit the generated DFT-s-OFDM symbol including the cyclic prefix and the PTRS. In some cases, the PTRS may be inserted before a DFT spreading operation used to generate the DFT-s-OFDM symbol; alternatively, the PTRS may be inserted after an IFFT operation used to generate the DFT-s-OFDM symbol.

Tone manager 1140 may identify a set of tones across the set of resource blocks different from the frequency corresponding to the DC tone, the set of tones corresponding to a set of symbols across the set of resource blocks and associated with at least one antenna port. Tone manager 1140 may assign a first subset of the set of tones for data and may assign a second subset of the set of tones for PTRS. In some cases, tone manager 1140 may reassign the second subset for data or a vacant tone and assign the modulation symbols to the second subset based on an ordering of a port-index, a tone index, a symbol index, or a combination thereof. In some cases, the second subset corresponds to an antenna port of the at least one antenna port. In some cases, the first subset or the second subset include vacant tones. In some cases, tone manager 1140 may assign a third subset of the plurality of tones for DMRS, wherein the third subset and the first subset overlap partially, completely, or not at all (e.g., being disjoint). In some cases, the third subset corresponds to a group of antenna ports of the at least one antenna port different from the first antenna port. Tone manager 1140 may transmit the first subset and the second subset using the scrambled modulation symbols. In some cases, the transmitting includes transmitting the second subset using the at least one antenna port based on a resource block assignment, the resource block assignment including a number of layers used for data in the set of resource blocks. In some cases, the first subset of tones may be associated with a group of antenna ports and the second subset of tones may be associated with a single antenna port, where each antenna port of the group of antenna ports is associated with the single antenna port (e.g., each antenna port of the group of antenna ports may apply PTRS from the single antenna port to track phase noise). In some cases, the second subset contains at most one tone per resource block of the set of resource blocks. Tone manager 1140 may transmit the third subset using the group of antenna ports, where the third subset includes each of the at most one tone per resource block of the set of resource blocks.

Scrambler 1145 may scramble a modulation symbol for each tone of the second subset, initialize the scrambling on a per-subframe basis or a per-symbol basis, and determine a first scrambling sequence for a first receiver and a second scrambling sequence for a second receiver. In some examples, scrambler 1145 may assign the first scrambling sequence or the second scrambling sequence to one or more tones of the second subset based on transmissions intended for the first receiver or the second receiver and initialize the scrambling based on receiver-specific information, the receiver-specific information including at least a RNTI. In some cases, the initializing is based on a function of a cell identifier, a subframe index, a symbol index, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
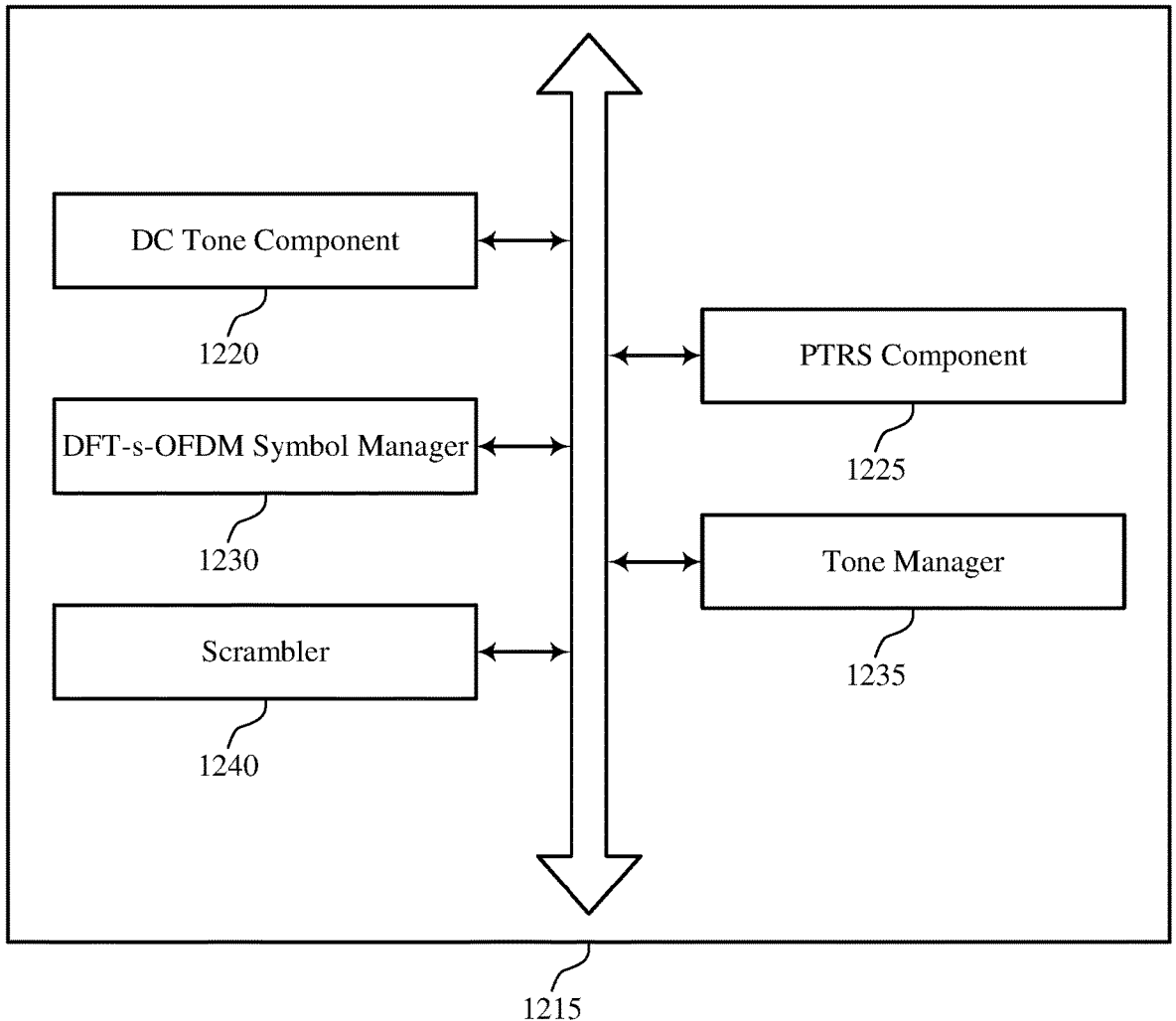

FIG. 12 shows a block diagram 1200 of a communications manager 1215 that supports enhancements to phase-noise compensation reference signal design and scrambling in accordance with aspects of the present disclosure. The communications manager 1215 may be an example of aspects of a communications manager 1015, a communications manager 1115, or a communications manager 1315 described with reference to FIGS. 10, 11, and 13. The communications manager 1215 may include DC tone component 1220, PTRS component 1225, DFT-s-OFDM symbol manager 1230, tone manager 1235, and scrambler 1240. Each of these modules may communicate, directly or indirectly, with one another (e.g., via one or more buses).

DC tone component 1220 may identify a frequency corresponding to a DC tone within a set of resource blocks and transmit an indication of the identified frequency corresponding to the DC tone. DC tone component 1220 may identify that a resource block of the set of resource blocks overlaps with the DC tone, where the one or more PTRS are transmitted using one or more resource blocks of the set of resource blocks that are different from the resource block including the DC tone. DC tone component 1220 may identify that a first resource block of the set of resource blocks overlaps with the DC tone, where the determining includes assigning at least some of the one or more PTRS to one or more frequencies of the first resource block PTRS component 1225 may determine a frequency for each of one or more PTRS based on the DC tone, each determined frequency different from the frequency corresponding to the DC tone. PTRS component 1225 may append a PTRS to the generated DFT-s-OFDM symbol. PTRS component 1225 may assign the one or more PTRS to a frequency of each RB that is different from the frequency corresponding to the DC tone. PTRS component 1225 may transmit the one or more PTRS using the set of resource blocks based on the determined frequency. In some cases, the frequency corresponding to each of the one or more PTRS is based on a number of component carriers, a system bandwidth, or both. PTRS component 1225 may determine that a tone of the second subset is unused for PTRS, and discard the modulation symbol corresponding to the tone based on the determining. PTRS component 1225 may identify that each resource block of the set of resource blocks includes at least some of the one or more PTRS, where the determining is based on identifying that each resource block includes at least some of the one or more PTRS. In some cases, a frequency density of the PTRS is based on a number of resource blocks in the set of resource blocks.

DFT-s-OFDM symbol manager 1230 may generate a DFT-s-OFDM symbol and append a cyclic prefix to the generated DFT-s-OFDM symbol. In some cases, the cyclic prefix is appended to the beginning of the generated DFT-s-OFDM symbol and the PTRS is appended to a beginning of the cyclic prefix, to an end of the generated DFT-s-OFDM symbol, or a combination thereof. In some cases, the generated DFT-s-OFDM symbol includes a guard interval, and appending the PTRS to the generated DFT-s-OFDM symbol includes replacing at least a portion of the guard interval with the PTRS. Alternatively, DFT-s-OFDM symbol manager 1230 may append the PTRS to an output of an IFFT OFDM operation (e.g., prior to appending a cyclic prefix). DFT-s-OFDM symbol manager 1230 may perform a weighted-overlap-and-add scheme for a second DFT-s-OFDM symbol associated with the generated DFT-s-OFDM symbol, the second DFT-s-OFDM symbol including a second cyclic prefix and a second PTRS. DFT-s-OFDM symbol manager 1230 may transmit the generated DFT-s-OFDM symbol including the cyclic prefix and the PTRS. In some cases, the PTRS may be inserted before a DFT spreading operation used to generate the DFT-s-OFDM symbol; alternatively, the PTRS may be inserted after an IFFT operation used to generate the DFT-s-OFDM symbol.

Tone manager 1235 may identify a set of tones across the set of resource blocks different from the frequency corresponding to the DC tone, the set of tones corresponding to a set of symbols across the set of resource blocks and associated with at least one antenna port. Tone manager 1235 may assign a first subset of the set of tones for data and may assign a second subset of the set of tones for PTRS. In some cases, tone manager 1235 may reassign the second subset for data or a vacant tone and assign the modulation symbols to the second subset based on an ordering of a port-index, a tone index, a symbol index, or a combination thereof. In some cases, the second subset corresponds to an antenna port of the at least one antenna port. In some cases, the first subset or the second subset include vacant tones. In some cases, tone manager 1235 may assign a third subset of the plurality of tones for DMRS, wherein the third subset and the first subset overlap partially, completely, or not at all (e.g., being disjoint). In some cases, the third subset corresponds to a group of antenna ports of the at least one antenna port different from the first antenna port. Tone manager 1235 may transmit the first subset and the second subset using the scrambled modulation symbols. In some cases, the transmitting includes transmitting the second subset using the at least one antenna port based on a resource block assignment, the resource block assignment including a number of layers used for data in the set of resource blocks. In some cases, the first subset of tones may be associated with a group of antenna ports and the second subset of tones may be associated with a single antenna port, where each antenna port of the group of antenna ports is associated with the single antenna port (e.g., each antenna port of the group of antenna ports may apply PTRS from the single antenna port to track phase noise). In some cases, the second subset contains at most one tone per resource block of the set of resource blocks. Tone manager 1235 may transmit the third subset using the group of antenna ports, where the third subset includes each of the at most one tone per resource block of the set of resource blocks.

Scrambler 1240 may scramble a modulation symbol for each tone of the second subset, initialize the scrambling on a per-subframe basis or a per-symbol basis, and determine a first scrambling sequence for a first receiver and a second scrambling sequence for a second receiver. In some examples, scrambler 1240 may assign the first scrambling sequence or the second scrambling sequence to one or more tones of the second subset based on transmissions intended for the first receiver or the second receiver and initialize the scrambling based on receiver-specific information, the receiver-specific information including at least a RNTI. In some cases, the initializing is based on a function of a cell identifier, a subframe index, a symbol index, or a combination thereof.

Figure 13:
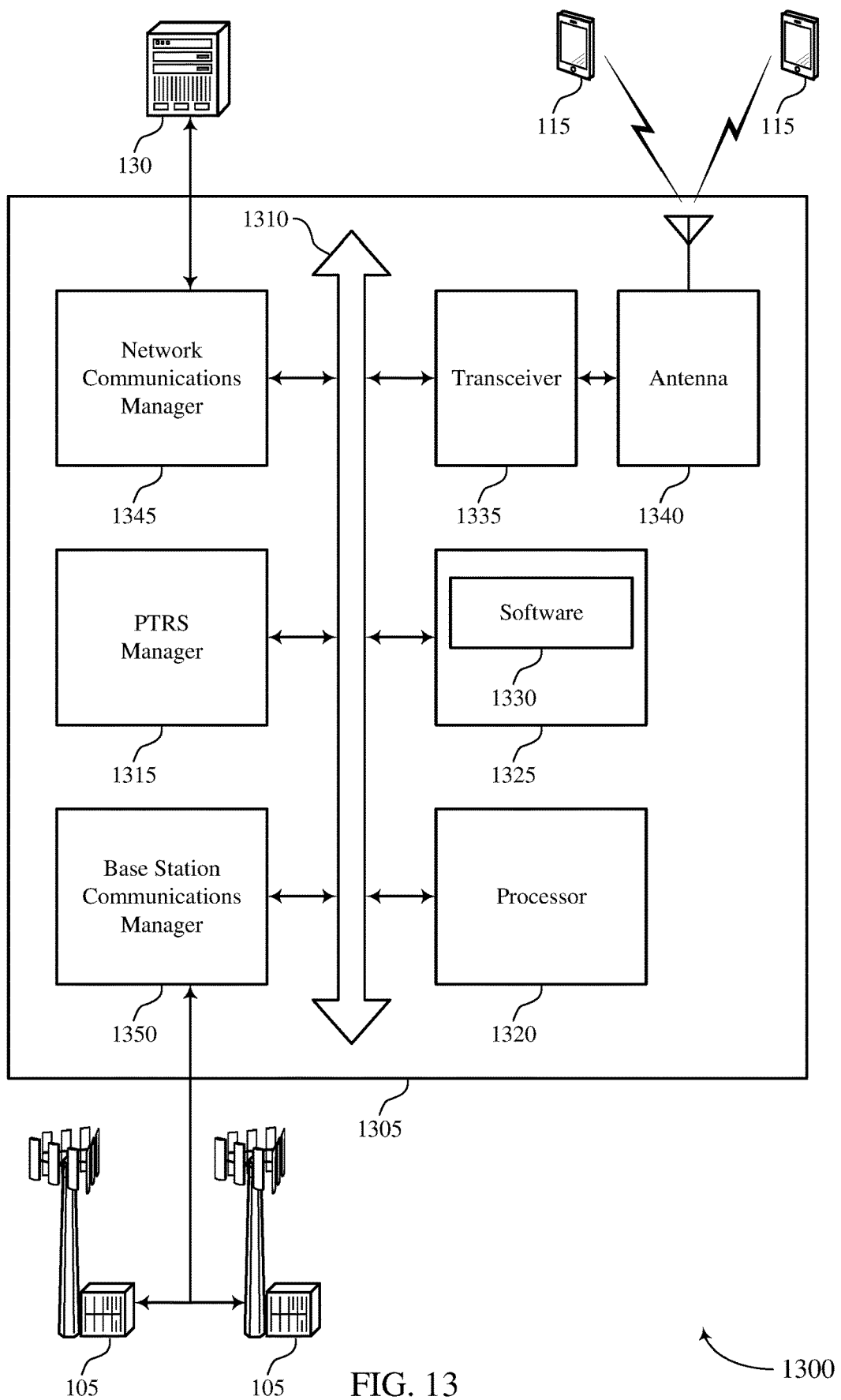
FIG. 13 illustrates a block diagram of a system including a base station that supports enhancements to PTRS design and scrambling in accordance with one or more aspects of the present disclosure.

FIG. 13 shows a diagram of a system 1300 including a device 1305 that supports enhancements to phase-noise compensation reference signal design and scrambling in accordance with aspects of the present disclosure. Device 1305 may be an example of or include the components of wireless device 1005, wireless device 1105, or a UE 115 or a base station 105 as described above, e.g., with reference to FIGS. 10 and 11. Device 1305 may include components for bi-directional voice and data communications including components for transmitting and receiving communications, including communications manager 1315, processor 1320, memory 1325, software 1330, transceiver 1335, antenna 1340, and I/O controller 1345. These components may be in electronic communication via one or more buses (e.g., bus 1310).

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting enhancements to phase-noise compensation reference signal design and scrambling).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support enhancements to phase-noise compensation reference signal design and scrambling. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
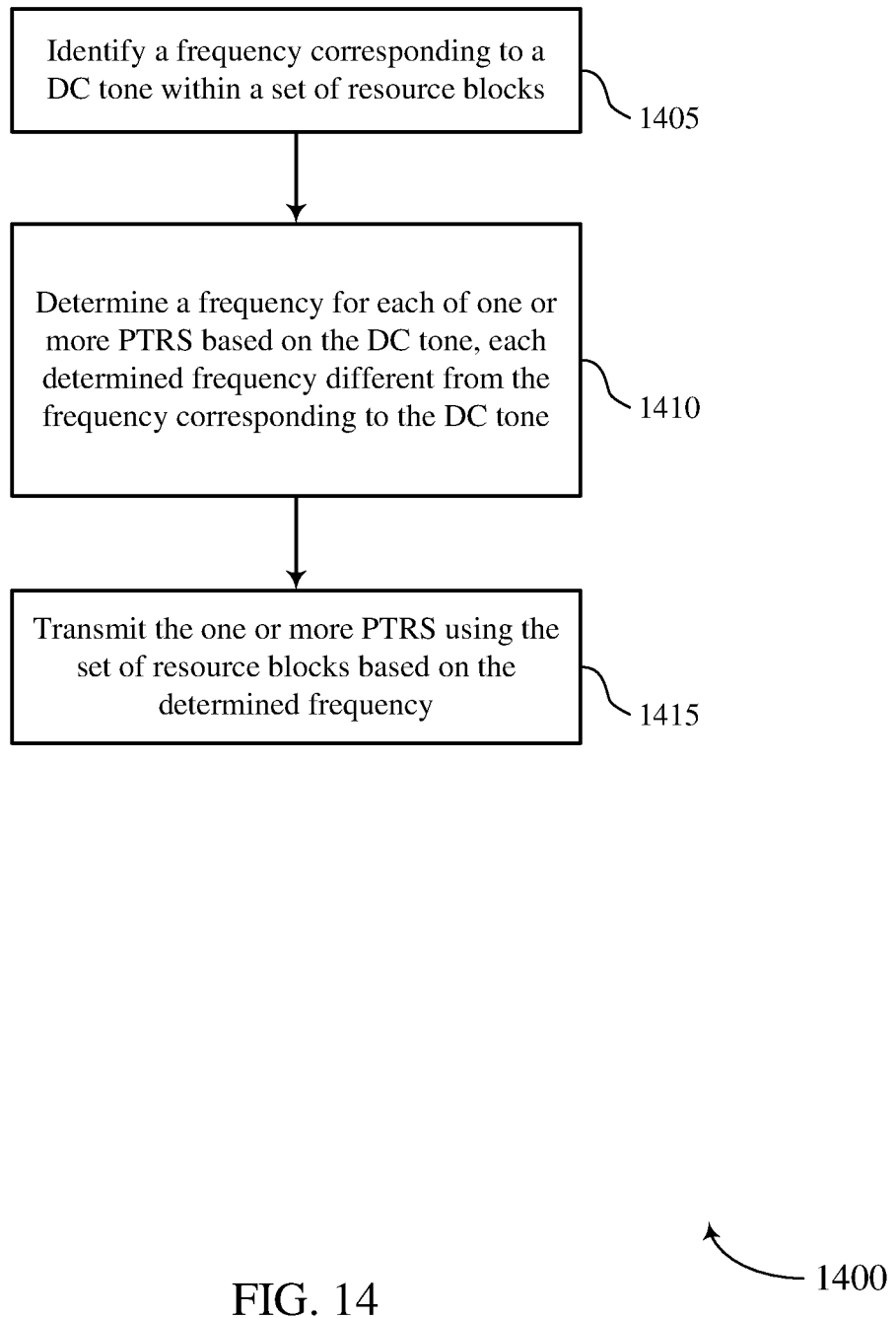
FIGS. 14 and 15 illustrate methods for enhancements to PTRS design and scrambling in accordance with one or more aspects of the present disclosure.

FIG. 14 shows a flowchart illustrating a method 1400 for enhancements to phase-noise compensation reference signal design and scrambling in accordance with aspects of the present disclosure. The operations of method 1400 may be implemented by a UE 115 or a base station 105 or its components as described herein. For example, the operations of method 1400 may be performed by a communications manager as described with reference to FIGS. 10 through 13. In some examples, a UE 115 or a base station 105 may execute a set of codes to control the functional elements of the device to perform the functions described below. Additionally or alternatively, the UE 115 or a base station 105 may perform aspects of the functions described below using special-purpose hardware.

At 1405 the UE 115 or a base station 105 may identify a frequency corresponding to a DC tone within a set of resource s. The operations of 1405 may be performed according to the methods described herein. In certain examples, aspects of the operations of 1405 may be performed by a DC tone component as described with reference to FIGS. 10 through 13.

At 1410 the UE 115 or a base station 105 determine a frequency for each of one or more PTRS (e.g., or some other applicable reference signal) based at least in part on the DC tone, each determined frequency different from the frequency corresponding to the DC tone. The operations of 1410 may be performed according to the methods described herein. In certain examples, aspects of the operations of 1410 may be performed by a DC tone component as described with reference to FIGS. 10 through 13.

At 1415 the UE 115 or a base station 105 may transmit the one or more PTRS using the set of resource s based at least in part on the determined frequency. The operations of 1415 may be performed according to the methods described herein. In certain examples, aspects of the operations of 1415 may be performed by a PTRS component as described with reference to FIGS. 10 through 13.

Figure 15:
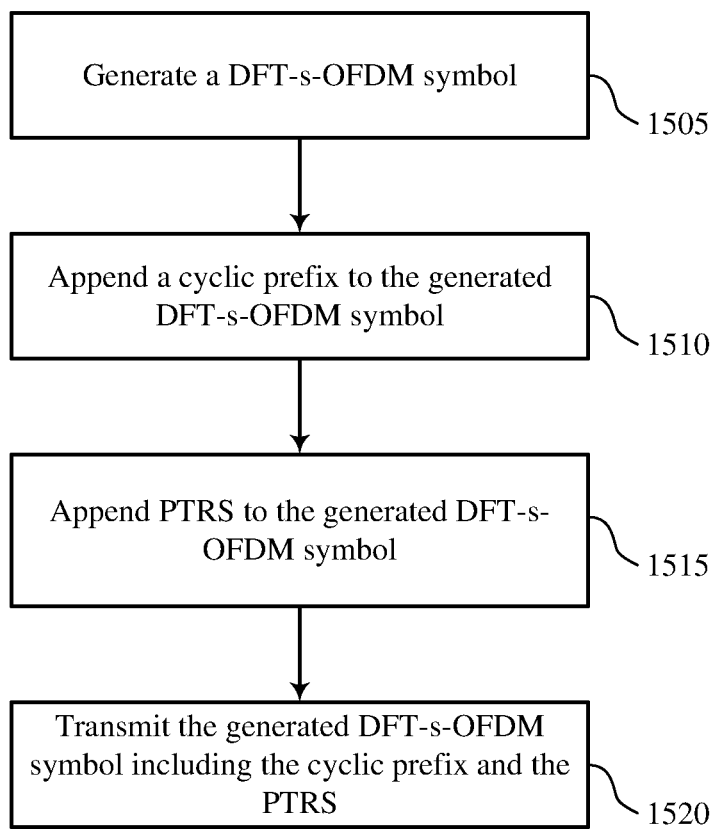

FIG. 15 shows a flowchart illustrating a method 1500 for enhancements to phase-noise compensation reference signal design and scrambling in accordance with aspects of the present disclosure. The operations of method 1500 may be implemented by a UE 115 or a base station 105 or its components as described herein. For example, the operations of method 1500 may be performed by a communications manager as described with reference to FIGS. 10 through 13. In some examples, a UE 115 or a base station 105 may execute a set of codes to control the functional elements of the device to perform the functions described below. Additionally or alternatively, the UE 115 or a base station 105 may perform aspects of the functions described below using special-purpose hardware.

At 1505 the UE 115 or a base station 105 may generate a DFT-s-OFDM symbol. The operations of 1505 may be performed according to the methods described herein. In certain examples, aspects of the operations of 1505 may be performed by a DFT-s-OFDM symbol manager as described with reference to FIGS. 10 through 13.

At 1510 the UE 115 or a base station 105 may append a cyclic prefix to the generated DFT-s-OFDM symbol. The operations of 1510 may be performed according to the methods described herein. In certain examples, aspects of the operations of 1510 may be performed by a DFT-s-OFDM symbol manager as described with reference to FIGS. 10 through 13.

At 1515 the UE 115 or a base station 105 may append a PTRS to the generated DFT-s-OFDM symbol. The operations of 1515 may be performed according to the methods described herein. In certain examples, aspects of the operations of 1515 may be performed by a PTRS component as described with reference to FIGS. 10 through 13. It is to be understood that the PTRS may alternatively be inserted into the DFT-s-OFDM symbol prior to the DFT spreading operation (e.g., as described with reference to FIG. 6) without deviating from the scope of the present disclosure.

At 1520 the UE 115 or a base station 105 may transmit the generated DFT-s-OFDM symbol comprising the cyclic prefix and the PTRS. The operations of 1520 may be performed according to the methods described herein. In certain examples, aspects of the operations of 1520 may be performed by a DFT-s-OFDM symbol manager as described with reference to FIGS. 10 through 13.

In some examples, aspects from two or more of the methods 1400 or 1500 described with reference to FIG. 14 or 15 may be combined. It should be noted that the methods 1400 or 1500 are just example implementations, and that the operations of the methods 1400 or 1500 may be rearranged or otherwise modified such that other implementations are possible.

Techniques described herein may be used for various wireless communications systems such as CDMA, TDMA, FDMA, OFDMA, single carrier frequency division multiple access (DFT-s-OFDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, shared) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, from a user equipment via radio resource control (RRC) signaling to an access network entity, an indication of a frequency corresponding to a direct current (DC) tone within a set of resource blocks.
2. An apparatus for wireless communication, comprising:
   a processor,
   memory coupled with the processor; and
   instructions stored in the memory and executable by the processor to cause the apparatus to:
   transmit, from a user equipment via radio resource control (RRC) signaling to an access network entity, an indication of a frequency corresponding to a direct current (DC) tone within a set of resource blocks.
3. A non-transitory computer-readable medium storing code for wireless communication, the code comprising instructions executable by a processor to:
   transmit, from a user equipment via radio resource control (RRC) signaling to an access network entity, an indication of a frequency corresponding to a direct current (DC) tone within a set of resource blocks.
4. A method for wireless communication, comprising:
   receiving, from a user equipment via radio resource control (RRC) signaling, an indication of a frequency corresponding to a direct current (DC) tone within a set of resource blocks.
5. An apparatus for wireless communication, comprising:
   a processor,
   memory coupled with the processor; and
   instructions stored in the memory and executable by the processor to cause the apparatus to:
   receive, from a user equipment via radio resource control (RRC) signaling, an indication of a frequency corresponding to a direct current (DC) tone within a set of resource blocks.
6. A non-transitory computer-readable medium storing code for wireless communication, the code comprising instructions executable by a processor to:
   receive, from a user equipment via radio resource control (RRC) signaling, an indication of a frequency corresponding to a direct current (DC) tone within a set of resource blocks.
7. The method of claim 1, wherein the RRC signaling relates to a configuration of an RRC connection.
8. The apparatus of claim 2, wherein the RRC signaling relates to a configuration of an RRC connection.
9. The non-transitory computer-readable medium of claim 3, wherein the RRC signaling relates to a configuration of an RRC connection.
10. The method of claim 4, wherein the RRC signaling relates to a configuration of an RRC connection.
11. The apparatus of claim 5, wherein the RRC signaling relates to a configuration of an RRC connection.
12. The non-transitory computer-readable medium of claim 6, wherein the RRC signaling relates to a configuration of an RRC connection.

* * * * *